US012432424B2

(12) United States Patent
Miyake et al.

(10) Patent No.: US 12,432,424 B2
(45) Date of Patent: Sep. 30, 2025

(54) VIDEO TRANSMISSION SYSTEM, TRANSMISSION APPARATUS, DISPLAY APPARATUS, VIDEO TRANSMISSION METHOD, AND RECORDING MEDIUM

(71) Applicant: Panasonic Intellectual Property Management Co., Ltd., Osaka (JP)

(72) Inventors: Yasushi Miyake, Osaka (JP); Yosuke Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/688,982

(22) PCT Filed: Aug. 22, 2022

(86) PCT No.: PCT/JP2022/031599
§ 371 (c)(1),
(2) Date: Mar. 4, 2024

(87) PCT Pub. No.: WO2023/037858
PCT Pub. Date: Mar. 16, 2023

(65) Prior Publication Data
US 2024/0373104 A1 Nov. 7, 2024

(30) Foreign Application Priority Data
Sep. 10, 2021 (JP) .................. 2021-147794

(51) Int. Cl.
*H04N 21/6379* (2011.01)
*H04N 21/2662* (2011.01)
(52) U.S. Cl.
CPC ..... *H04N 21/6379* (2013.01); *H04N 21/2662* (2013.01)
(58) Field of Classification Search
CPC ........ H04N 21/6379; H04N 21/2662
(Continued)

(56) References Cited

U.S. PATENT DOCUMENTS

2006/0258291 A1 11/2006 Nakata et al.
2010/0121974 A1\* 5/2010 Einarsson ............... H04L 47/25
370/328
(Continued)

FOREIGN PATENT DOCUMENTS

JP 2002-171293 A 6/2002
JP 2005-006286 A 1/2005
(Continued)

OTHER PUBLICATIONS

Extended European Search Report dated Nov. 27, 2024 issued in the corresponding European Patent Application No. 22867180.6.
(Continued)

*Primary Examiner* — Jeffery A Williams
(74) *Attorney, Agent, or Firm* — Rimon P.C.

(57) ABSTRACT

A video transmission system includes a transmission apparatus, display apparatus, and controller. The transmission apparatus includes a transmitter that divides a second video stream of a second bit rate into a plurality of transmission packets and transmits the plurality of transmission packets to the display apparatus. The display apparatus includes a decoder that decodes a video for display from the plurality of transmission packets, and a determiner that determines whether packet loss has occurred. The controller (i) controls the encoding to reduce the second bit rate by a predefined amount or reduce the second bit rate at a transmission rate of a certain proportion when an occurrence of packet loss is indicated, and (ii) causes the transmitter to transmit a plurality of dummy packets, along with the transmission packets, to the display apparatus via a network when no occurrence of packet loss has been indicated for a predetermined time.

15 Claims, 13 Drawing Sheets

(58) Field of Classification Search
USPC .................................................. 375/240.01
See application file for complete search history.

(56) References Cited

U.S. PATENT DOCUMENTS

| 2011/0055882 A1* | 3/2011 | Ohya | .................. H04N 21/658 |
| | | | 725/93 |
| 2012/0166582 A1* | 6/2012 | Binder | ................... G06F 21/80 |
| | | | 709/217 |

FOREIGN PATENT DOCUMENTS

| JP | 2009-296028 A | 12/2009 |
| JP | 2011-055286 A | 3/2011 |
| JP | 5078668 B2 | 11/2012 |
| JP | 2017-069849 A | 4/2017 |

OTHER PUBLICATIONS

Japanese Office Action dated Nov. 26, 2024 issued in the corresponding Japanese Patent Application No. 2023-546864.
International Search Report dated Nov. 1, 2022 issued in International Patent Application No. PCT/JP2022/031599, with English translation.

* cited by examiner

VIDEO TRANSMISSION SYSTEM, TRANSMISSION APPARATUS, DISPLAY APPARATUS, VIDEO TRANSMISSION METHOD, AND RECORDING MEDIUM

CROSS-REFERENCE OF RELATED APPLICATIONS

This application is the U.S. National Phase under 35 U.S.C. § 371 of International Patent Application No. PCT/JP2022/031599, filed on Aug. 22, 2022, which in turn claims the benefit of Japanese Patent Application No. 2021-147794, filed on Sep. 10, 2021, the entire disclosures of which Applications are incorporated by reference herein.

TECHNICAL FIELD

The present disclosure relates to a video transmission system, a transmission apparatus, a display apparatus, a video transmission method, and a recording medium.

BACKGROUND ART

Patent Literature 1 (PTL 1) discloses an IP gateway device that transmits a pseudo RTP packet for measuring the bandwidth, automatically measures the traffic condition of an IP network by calculating the loss ratio of the transmitted pseudo RTP packet, and, based on the measurement result, controls the incoming and outgoing channels of the audio data being sent via the IP network.

CITATION LIST

Patent Literature

[PTL 1]
  Japanese Unexamined Patent Application Publication No. 2002-171293

SUMMARY OF INVENTION

Technical Problem

The present disclosure provides a video transmission system and others that can appropriately adjust the bitstream of a video stream being transmitted in accordance with the communication bandwidth of the network.

Solution to Problem

A video transmission system according to the present disclosure includes: a transmission apparatus that transmits a video stream; a display apparatus that is separate from the transmission apparatus, receives the video stream, and displays a video represented by the video stream; and a controller, wherein the transmission apparatus includes: an encoder that performs encoding of a first video stream to generate a second video stream, the encoding causing a first bit rate of the first video stream to be a second bit rate lower than or equal to the first bit rate; and a transmitter that divides the second video stream into a plurality of transmission packets and transmits a plurality of packets including the plurality of transmission packets to the display apparatus via a network, the display apparatus includes: a receiver that receives the plurality of packets; a decoder that generates the second video stream using the plurality of transmission packets and decodes a video for display from the second video stream; a display that displays the video for display; and a determiner that determines whether packet loss has occurred, based on the plurality of packets received by the receiver, and the controller: (i) controls the encoding performed by the encoder to reduce the second bit rate by a predefined amount or reduce the second bit rate at a transmission rate of a certain proportion, when a determination result of the determiner indicates that packet loss has occurred; and (ii) causes the transmitter to transmit a plurality of dummy packets, along with the plurality of transmission packets, to the display apparatus via the network, when the determination result indicates that packet loss has not occurred for a predetermined time.

A transmission apparatus according to the present disclosure is a transmission apparatus included in a video transmission system, and the video transmission system includes the transmission apparatus that transmits a video stream, a display apparatus that is separate from the transmission apparatus, receives the video stream, and displays a video represented by the video stream, and a controller. The transmission apparatus includes: an encoder that performs encoding of a first video stream to generate a second video stream, the encoding causing a first bit rate of the first video stream to be a second bit rate lower than or equal to the first bit rate; and a transmitter that divides the second video stream into a plurality of transmission packets and transmits a plurality of packets including the plurality of transmission packets to the display apparatus via a network, wherein the controller: (i) controls the encoding performed by the encoder to reduce the second bit rate by a predefined amount or reduce the second bit rate at a transmission rate of a certain proportion, when a determination result of whether packet loss has occurred in the display apparatus indicates an occurrence of packet loss; and (ii) causes the transmitter to transmit a plurality of dummy packets, along with the plurality of transmission packets, to the display apparatus via the network, when the determination result indicates that packet loss has not occurred for a predetermined time.

A display apparatus according to the present disclosure is a display apparatus included in a video transmission system, and the video transmission system includes a transmission apparatus that transmits a video stream, the display apparatus that is separate from the transmission apparatus, receives the video stream, and displays a video represented by the video stream, and a controller. The display apparatus includes: a receiver that receives a plurality of packets including a plurality of transmission packets from the transmission apparatus via a network; a decoder that generates a second video stream from the plurality of transmission packets and decodes a video for display from the second video stream; a display that displays the video for display; and a determiner that determines whether packet loss has occurred, based on the plurality of packets received by the receiver, wherein the plurality of transmission packets are generated by the transmission apparatus by dividing the second video stream of a second bit rate lower than or equal to a first bit rate, the second video stream being generated through encoding of a first video stream of the first bit rate, and the controller: (i) controls the encoding performed by the transmission apparatus to reduce the second bit rate by a predefined amount or reduce the second bit rate at a transmission rate of a certain proportion, when a determination result of the determiner indicates that packet loss has occurred; and (ii) causes the transmission apparatus to transmit a plurality of dummy packets, along with the plurality of transmission packets, to display apparatus via the network, when the determination result indicates that packet loss has not occurred for a predetermined time.

A video transmission method according to the present disclosure is a video transmission method for a video transmission system, and the video transmission system includes a transmission apparatus that transmits a video stream, a display apparatus that is separate from the transmission apparatus, receives the video stream, and displays a video represented by the video stream, and a controller. The video transmission method includes: by the transmission apparatus: performing encoding of a first video stream to generate a second video stream, the encoding causing a first bit rate of the first video stream to be a second bit rate lower than or equal to the first bit rate; and dividing the second video stream into a plurality of transmission packets and transmitting a plurality of packets including the plurality of transmission packets to the display apparatus via a network, by the display apparatus: receiving the plurality of packets; generating the second video stream from the plurality of transmission packets and decoding a video for display from the second video stream; displaying the video for display; and determining whether packet loss has occurred, based on the plurality of packets received, and by the controller: (i) controlling the encoding performed by the transmission apparatus to reduce the second bit rate by a predefined amount or reduce the second bit rate at a transmission rate of a certain proportion, when a determination result of the display apparatus indicates an occurrence of packet loss; and (ii) causing the transmission apparatus to transmit a plurality of dummy packets, along with the plurality of transmission packets, to the display apparatus via the network, when the determination result indicates that packet loss has not occurred for a predetermined time.

It is to be noted that general or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Advantageous Effects of Invention

The video transmission system and others according to the present disclosure can appropriately adjust the bitstream of a video stream being transmitted in accordance with the communication bandwidth of the network.

DESCRIPTION OF EMBODIMENTS

Figure 1:
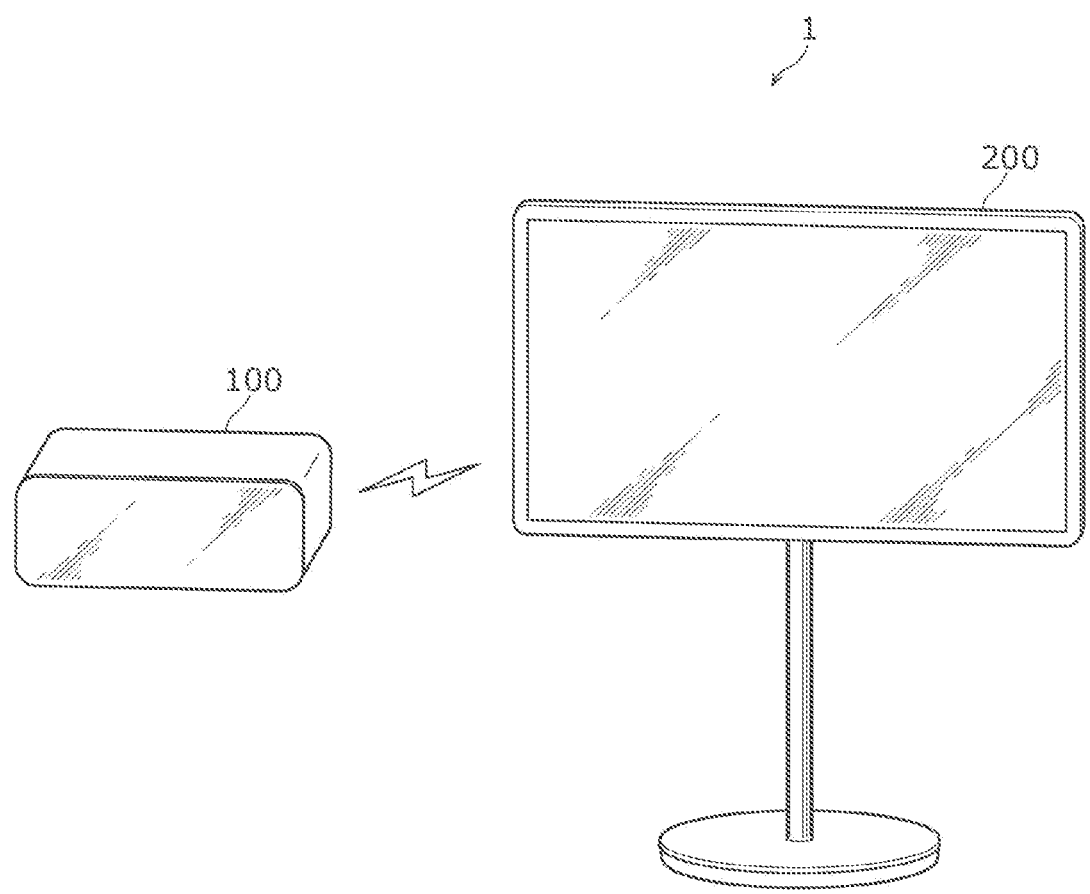
FIG. 1 is a diagram showing an overview of a video transmission system according to an embodiment.

A video transmission system according to one aspect of the present disclosure is a video transmission system that includes a transmission apparatus that transmits a video stream; a display apparatus that is separate from the transmission apparatus, receives the video stream, and displays a video represented by the video stream; and a controller. The transmission apparatus includes an encoder that performs encoding of a first video stream to generate a second video stream, the encoding causing a first bit rate of the first video stream to be a second bit rate lower than or equal to the first bit rate; and a transmitter that divides the second video stream into a plurality of transmission packets and transmits a plurality of packets including the plurality of transmission packets to the display apparatus via a network. The display apparatus includes a receiver that receives the plurality of packets; a decoder that generates the second video stream using the plurality of transmission packets and decodes a video for display from the second video stream; a display that displays the video for display; and a determiner that determines whether packet loss has occurred, based on the plurality of packets received by the receiver. The controller (i) controls the encoding performed by the encoder to lower the second bit rate, when a determination result of the determiner indicates that packet loss has occurred; and (ii) causes the transmitter to transmit a plurality of dummy packets, along with the plurality of transmission packets, to the display apparatus via the network, when the determination result indicates that packet loss has not occurred for a predetermined time.

According to this configuration, the controller determines that the communication bandwidth between the transmission apparatus and the display apparatus is not sufficient for the transmission of a video stream if packet loss occurs in the display apparatus, and controls the encoding performed by the encoder of the transmission apparatus so as to lower the second bit rate. Therefore, the transmission apparatus can lower the bit rate of the video stream in accordance with the communication bandwidth and transmit the video stream without any loss from the transmission apparatus to the display apparatus.

Furthermore, the controller determines that the communication bandwidth is sufficient for the transmission of a video stream if it is indicated in the display apparatus that packet loss has not occurred for a predetermined time, and causes the transmission apparatus to transmit a plurality of dummy packets, along with the plurality of transmission packets, to the display apparatus. With this configuration, the transmission apparatus transmits, to the display apparatus, data of a bit rate that is greater by the bit rate of the dummy packets. Accordingly, the communication bandwidth can be determined to be less congested than before the dummy packets are transmitted.

Therefore, the bitstream of a video stream being transmitted can be adjusted appropriately in accordance with the communication bandwidth of the network.

Furthermore, the controller may control the encoding performed by the encoder to avoid changing the second bit rate, when the determination result indicates that packet loss has not occurred for a predetermined time.

With this configuration, the transmission apparatus transmits, to the display apparatus, data of a bit rate that is greater by the bit rate of the dummy packets. Accordingly, the communication bandwidth can be measured to be less congested than before the dummy packets are transmitted. Since it is a dummy packet that may get lost when the communication bandwidth is narrowed and packet loss occurs as a result, the plurality of packets can be transmitted from the transmission apparatus to the display apparatus such that the video stream is not disrupted.

Furthermore, the controller may control the encoding performed by the encoder to raise the second bit rate, when the determination result indicates that packet loss has not occurred for the predetermined time while the transmitter is transmitting the plurality of dummy packets.

With this configuration, the second bit rate is raised if it is determined that the communication bandwidth is sufficient for the transmission of a video stream while the dummy packets are being transmitted, the quality of the video can be improved when there is a sufficient communication bandwidth.

Furthermore, when controlling the encoding performed by the encoder to raise the second bit rate, the controller may raise the second bit rate by a bit rate corresponding to a transmission rate of the plurality of dummy packets.

With this configuration, the second bit rate is raised by a bit rate corresponding to the transmission rate of the plurality of dummy packets if it is determined that the communication bandwidth is sufficient for the transmission of the video stream while the dummy packets are being transmitted, the quality of the video can be improved when there is a sufficient communication bandwidth.

Furthermore, the controller may cause the transmitter to transmit the plurality of packets without the plurality of dummy packets to the display apparatus via the network, when the determination result indicates an occurrence of packet loss while the transmitter is transmitting the plurality of dummy packets.

With this configuration, if it is determined that the communication bandwidth between the transmission apparatus and the display apparatus is not sufficient for the transmission of a video stream while the dummy packets are being transmitted, transmission control is performed so as not to transmit the dummy packets, and thus the bit rate of the transmission can be lowered without lowering the quality of the video.

Furthermore, the controller may further control the encoding performed by the encoder to avoid changing the second bit rate, when the determination result indicates an occurrence of packet loss while the transmitter is transmitting the plurality of dummy packets.

With this configuration, if it is determined that the communication bandwidth between the transmission apparatus and the display apparatus is not sufficient for the transmission of a video stream while the dummy packets are being transmitted, transmission control is performed so as not to transmit the dummy packets while performing encoding control of refraining from changing the second bit rate, and thus the bit rate of the transmission can be lowered without lowering the quality of the video.

Furthermore, when transmitting the plurality of dummy packets along with the plurality of transmission packets, the transmitter may transmit the plurality of transmission packets with priority over the plurality of dummy packets.

Therefore, since it is a dummy packet that gets lost with priority over the transmission packets when the communication bandwidth is narrowed and packet loss occurs as a result, the video stream can be transmitted from the transmission apparatus to the display apparatus without any disruption.

Furthermore, when transmitting the plurality of dummy packets, the transmitter may transmit the plurality of dummy packets at a fixed transmission rate.

With this configuration, by transmitting the dummy packets or stopping the transmission of the dummy packets, the transmission rate of the packets from the transmission apparatus can be adjusted.

It is to be noted that general or specific aspect of the above may be implemented in the form of a transmission apparatus, a display apparatus, an integrated circuit, a computer program, or a non-transitory computer readable recording medium, such as a CD-ROM, or through any desired combination of a transmission apparatus, a display apparatus, an integrated circuit, a computer program, and a non-transitory recording medium.

Hereinafter, an embodiment will be described in detail with reference to the drawings as appropriate. It is to be noted, however, that any description that is more elaborate than necessary may be omitted. For example, features that are already well known may not be described in detail, or duplicate description of substantially identical configurations may be omitted. This is for keeping the following description from becoming more lengthy than necessary and for facilitating an understanding of a person skilled in the art.

It is to be noted that the inventor(s) provide the appended drawings and the following description merely to help a person skilled in the art understand the present disclosure at a sufficient level, and the drawings and description are not intended to limit the subject matter set forth in the claims.

Embodiment

An embodiment will be described below with reference to FIG. 1 to FIG. 13.

1-1. Configuration

FIG. 1 is a diagram showing an overview of a video transmission system according to an embodiment.

As shown in FIG. 1, video transmission system 1 includes transmission apparatus 100 and display apparatus 200. Transmission apparatus 100 transmits a video stream. Display apparatus 200 receives a video stream transmitted by transmission apparatus 100 and displays a video represented by the video stream. Herein, transmission apparatus 100 may obtain, along with a video stream, an audio stream corresponding to the video stream. Transmission apparatus 100 may obtain an encoded stream that includes a video stream and an audio stream. Upon receiving an encoded stream, display apparatus 200 may display a video of a video stream included in the encoded stream and may also output an audio of an audio stream included in the encoded stream.

Transmission apparatus 100 obtains a video stream. Transmission apparatus 100 is connected, for example, to an antenna (not shown) and may obtain a video stream from airwaves received by the antenna. Alternatively, transmission apparatus 100 may obtain a video stream, for example, via a communication network, such as the internet. Alternatively, transmission apparatus 100 may obtain a video stream, for example, by reproducing video data stored in a recording medium. In this example, a recording medium may be, for example, a non-volatile memory, such as a hard disk drive (HDD) or a solid state drive (SSD), or may be an optical disc, such as a Blu-ray (registered trademark) disc (BD) or a digital versatile disc (DVD). Herein, in a case in which transmission apparatus 100 obtains an encoded stream, transmission apparatus 100 may obtain an encoded stream from any source similar to those described above from which transmission apparatus 100 obtains a video stream.

Transmission apparatus 100 compresses an obtained video stream (referred to below as "first video stream") at an encoding rate corresponding to the effective communication bandwidth of the network and transmits the compressed video stream (referred to below as "second video stream") to display apparatus 200. A first video stream may be a video stream having a resolution of, for example, 4K or 8K.

Display apparatus 200 is an apparatus separate from transmission apparatus 100. Display apparatus 200 is an apparatus that is associated in advance as a receiver of a video stream that transmission 100 transmits. Furthermore, display apparatus 200 is associated in advance as a transmitter that transmits a control signal to transmission apparatus 100.

Transmission apparatus 100 is capable of communicating with display apparatus 200 via a network. Transmission apparatus 100 transmits a second video stream to display apparatus 200 via a network. Display apparatus 200 receives a second video stream from transmission apparatus 100 via a network. Transmission apparatus 100 and display apparatus 200 may communicate with each other, for example, via wireless communication, such as a wireless local area network (LAN), or via wired communication, such as a wired LAN. Transmission apparatus 100 and display apparatus 200 may communicate with each other via wireless communication of a communication standard other than the wireless LAN or via wired communication of a communication standard other than the wired LAN. Transmission apparatus 100 and display apparatus 200 may communicate with each other directly over a network that does not involve any other devices or indirectly over a network that involves another device, such as an access point. In the example described below, transmission apparatus 100 and display apparatus 200 directly communicate with each other wirelessly without any other devices involved therebetween.

Figure 2:
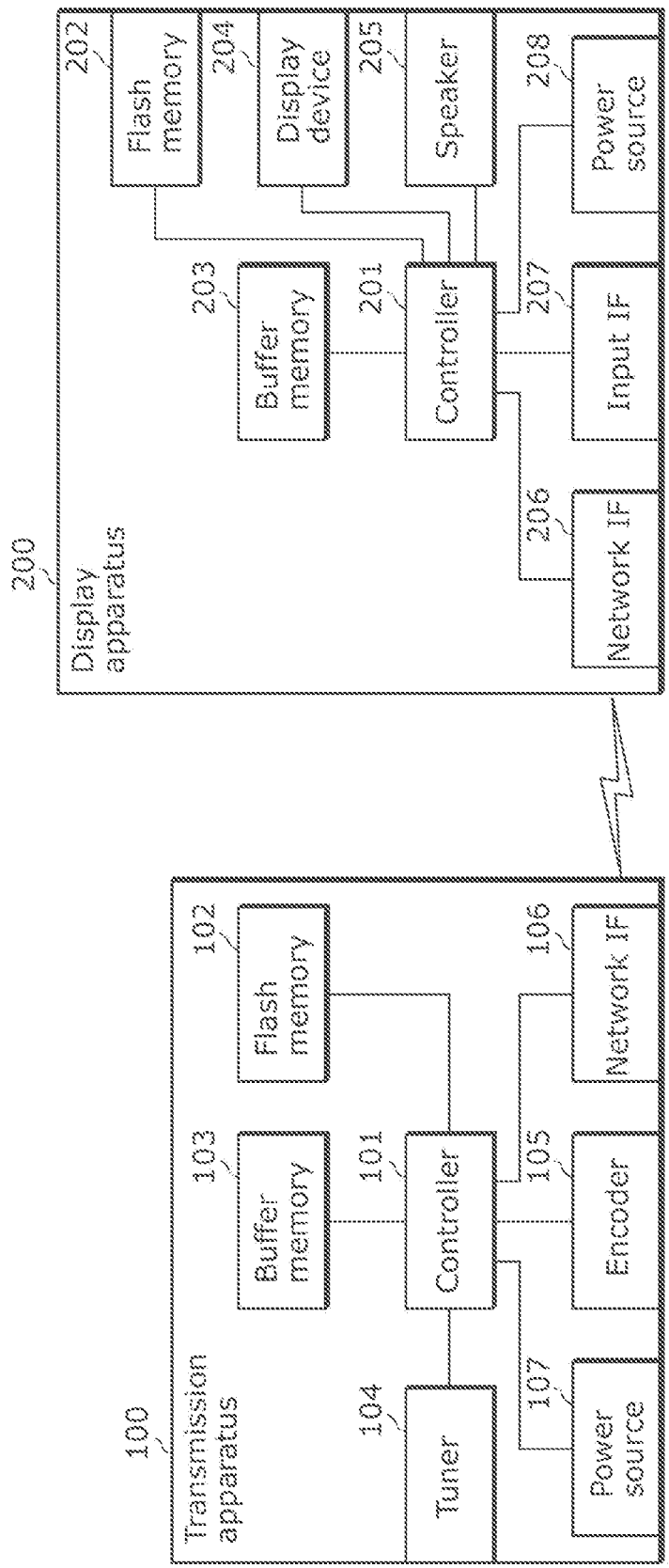
FIG. 2 is a diagram showing one example of a hardware configuration of the video transmission system according to the embodiment.

FIG. 2 is a diagram showing one example of a hardware configuration of the video transmission system according to the embodiment. Specifically, FIG. 2 is a diagram showing one example of a hardware configuration of transmission apparatus 100 and one example of a hardware configuration of display apparatus 200.

<<Hardware Configuration of Transmission Apparatus>>

As shown in FIG. 2, transmission apparatus 100 includes controller 101, flash memory 102, buffer memory 103, tuner 104, encoder 105, network interface (IF) 106, and power source 107.

Controller 101 is a control circuit that, in order to execute a predetermined process on an obtained first video stream, outputs various control instructions to flash memory 102, buffer memory 103, tuner 104, encoder 105, network IF 106, and power source 107. Controller 101 is a processing circuit for implementing the functions of transmission apparatus 100.

Not only does controller 101 output control instructions, but controller 101 may also execute various processes. For example, controller 101 may have a function of a decoder that decodes an encoded stream obtained from tuner 104 to obtain a first video stream. If an encoded stream is a multiplex stream (i.e., in a case in which an encoded stream includes a first video stream and a first audio stream), controller 101 may demultiplex the encoded stream and then decode the video encoded stream and the audio encoded stream obtained through the demultiplexing into, respectively, a first video stream and a first audio stream.

Furthermore, controller 101 may divide a second video stream obtained by encoder 105 into a plurality of transmission packets and transmit a plurality of packets including the plurality of transmission packets to display apparatus 200 via network IF 106. At this point, controller 101 may also divide a first audio stream, like the second video stream, into a plurality of transmission packets and transmit the plurality of transmission packets to display apparatus 200 via network IF 106.

Controller 101 may be implemented by a general purpose processor, such as a central processing unit (CPU), that executes a predetermined control program or by a dedicated circuit. Controller 101 may include a plurality of processors, a plurality of dedicated circuits, or a processor and a dedicated circuit.

Flash memory 102 stores a predetermined control program. Flash memory 102 may include a plurality of recording media.

Buffer memory 103 is a volatile storage area that is used as a work area when controller 101 executes a program. Buffer memory 103 is, for example, a random access memory (RAM). Herein, buffer memory 103 may be included in controller 101.

Tuner 104 converts an analog signal constituting airwaves received by an antenna (not shown) to an encoded stream of a digital signal and outputs the encoded stream obtained through the conversion to controller 101.

Encoder 105 encodes an obtained first video stream and outputs an encoded second video stream. Encoder 105 generates a second video stream, for example, by encoding a first video stream to achieve a bitstream specified by controller 101. Encoder 105 may encode a first video stream at an intra-frame encoding rate or an inter-frame encoding rate to achieve a bitstream specified by controller 101.

Encoder 105 may encode a first video stream to achieve a bitstream specified by controller 101, by reducing the resolution of each frame of the first video stream, that is, by compressing each frame of the first video stream. Encoder 105 may encode a first video stream to achieve a bitstream specified by controller 101, by lowering the frame rate of the first video stream. Encoder 105 may encode a first video stream to achieve a bitstream specified by controller 101, by subjecting the first video stream to a combined process of compressing each frame and lowering the frame rate.

Herein, a bit rate specified by controller 101 may be the same as the bit rate of a first video stream. In this case, encoder 105 may output a first video stream without any change made thereto.

Network IF 106 is a communication interface for transmitting and receiving data to and from display apparatus 200. Network IF 106 may be, for example, an interface for wireless communication, such as a wireless LAN interface.

Network IF 106 may be, for example, a wireless LAN interface compliant with IEEE 802.11a, 11b, 11g, 11n, 11ac, or 11ax standards.

Power source 107 receives power from an external power source, such as a commercial power source or an external battery, and supplies power to constituent elements within transmission apparatus 100.

<<Hardware Configuration of Display Apparatus>>

Display apparatus 200 includes controller 201, flash memory 202, buffer memory 203, display device 204, speaker 205, network IF 206, input IF 207, and power source 208.

Controller 201 is a control circuit that, in order to execute, for example, a process of receiving a plurality of transmission packets including packets of a second video stream or a process of displaying a video for display based on a plurality of transmission packets received, outputs various control instructions to flash memory 202, buffer memory 203, display device 204, speaker 205, network IF 206, input IF 207, and power source 208. Controller 201 is a processing circuit for implementing the functions of display apparatus 200.

Not only does controller 201 output control instructions, but controller 201 may also execute various processes. For example, controller 201 may have a function of a decoder that generates a second video stream from a plurality of transmission packets received by network IF 206 and decodes a video for display from the second video stream. In a case in which a plurality of transmission packets include data of a second video stream and data of a first audio stream, controller 201 may have a function of a decoder that further generates a first audio stream from the plurality of transmission packets and decodes an audio for output from the first audio stream.

Controller 201 may be implemented by a general purpose processor, such as a CPU, that executes a predetermined control program or by a dedicated circuit. Controller 201 may include a plurality of processors, a plurality of dedicated circuits, or a processor and a dedicated circuit.

Flash memory 202 stores a predetermined control program. Flash memory 202 may include a plurality of recording media.

Buffer memory 203 is a volatile storage area that is used as a work area when controller 201 executes a program. Buffer memory 203 is, for example, a RAM. Herein, buffer memory 203 may be included in controller 201.

Display device 204 displays a video for display obtained from a second video stream output by controller 201. Display device 204 is, for example but is not limited to, a liquid crystal display or an organic electroluminescence (EL) display.

Speaker 205 outputs an audio for output obtained from a first audio stream output by controller 201.

Network IF 206 is a communication interface for transmitting and receiving data to and from transmission apparatus 100. Network IF 206 may be, for example, an interface for wireless communication, such as a wireless LAN interface. Network IF 206 may be, for example, a wireless LAN interface compliant with at least one of IEEE 802.11a, 11b, 11g, 11n, 11ac, and 11ax standards.

Input IF 207 is an interface for receiving an input from a user. Input IF 207 may be a pointing device, such as a mouse, a touch pad, a touch panel, or a trackball, or may be a keyboard. Input IF 207 may be a receiver that receives a control signal output from a remote controller (not shown) that receives an input from a user and output in accordance with the input that the remote controller has received.

Power source 208 receives power from an external power source, such as a commercial power source or an external battery, and supplies power to constituent elements within transmission apparatus 100.

Figure 3:
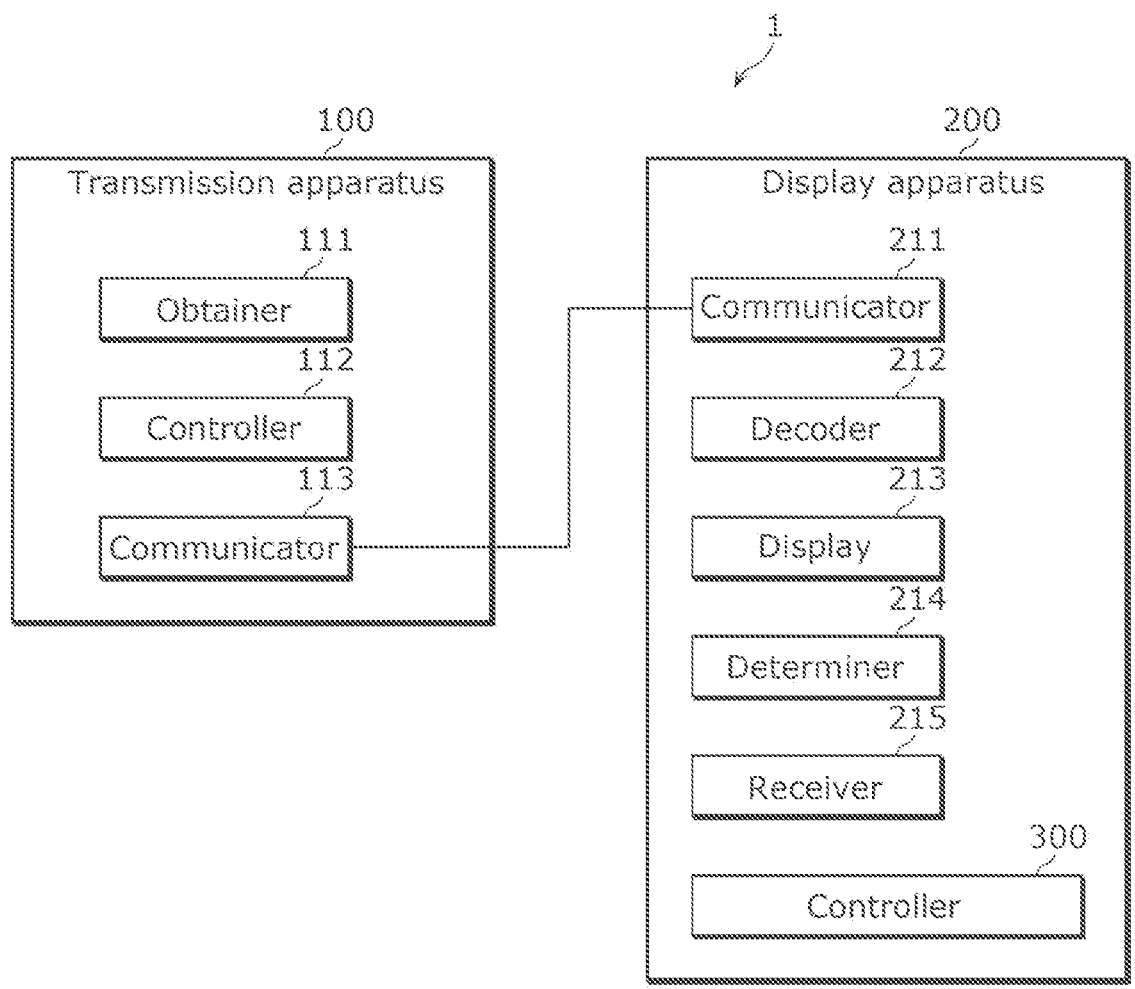
FIG. 3 is a diagram showing one example of a functional configuration of the video transmission system according to the embodiment.

FIG. 3 is a diagram showing one example of a functional configuration of the video transmission system according to the embodiment. Specifically, FIG. 3 is a diagram showing one example of a functional configuration of transmission apparatus 100 and one example of a functional configuration of display apparatus 200.

<<Functional Configuration of Transmission Apparatus>>

As shown in FIG. 3, transmission apparatus 100 includes, in terms of its functional configuration, obtainer 111, controller 112, and communicator 113.

Obtainer 111 obtains a first video stream. Obtainer 111 may obtain a first video stream, for example, from airwaves. Obtainer 111 may further obtain an audio stream corresponding to a first video stream. Obtainer 111 may obtain an audio stream corresponding to a first video stream, for example, from airwaves. Obtainer 111 may be implemented by, for example but not limited to, controller 101, tuner 104, flash memory 102, or buffer memory 103. Herein, obtainer 111 may obtain a first video stream from, for example, the internet or a recording medium.

Controller 112 generates a second video stream by encoding a first video stream to turn the first video stream of a first bit rate to a video stream of a second bit rate. In other words, controller 112 generates a second video stream of a second bit rate by encoding a first video stream of a first bit rate. A second bit rate is a bit rate lower than or equal to a first bit rate. Specifically, controller 112 may encode a first video stream to achieve a second bit rate by reducing the resolution of each frame of the first video stream, that is, by compressing each frame of the first video stream. Controller 112 may encode a first video stream to achieve a second bit rate by lowering the frame rate of the first video stream. Controller 112 may encode a first video stream to achieve a second bit rate by subjecting the first video stream to a combined process of compressing each frame and lowering the frame rate. Controller 112 is one example of an encoder of transmission apparatus 100.

Controller 112 may control obtainer 111 in accordance with a control instruction received by communicator 113. Specifically, controller 112 may change an encoded stream to be obtained by obtainer 111 by switching the airwaves received by tuner 104 to a channel corresponding to a control instruction (a channel selection instruction). Furthermore, in accordance with a control instruction, controller 112 may change the second bit rate to target when encoding a first video stream to a second video stream.

Controller 112 is implemented by, for example but not limited to, controller 101, flash memory 102, buffer memory 103, or encoder 105.

Communicator 113 transmits and receives data to and from display apparatus 200 via wireless communication. Specifically, communicator 113 divides a second video stream generated by controller 112 into a plurality of transmission packets and transmits a plurality of packets including the plurality of transmission packets to display apparatus 200 via wireless communication. Specifically, communicator 113 generates a plurality of transmission packets by dividing a second video stream into a plurality of data units and turning the plurality of data units into packets. Communicator 113 transmits a plurality of packets including a plurality of transmission packets one by one successively to display apparatus 200 via wireless communication. Identification information, such as a packet sequence number, may be added to each of a plurality of transmission packets. In other words, each of a plurality of transmission packets may include information indicating its place in the sequence of transmission. Communicator 113 is one example of a transmitter of transmission apparatus 100.

Communicator 113 may receive a control instruction from display apparatus 200. Communicator 113 outputs a received control instruction to controller 112.

Communicator 113 is implemented by, for example but not limited to, controller 101, flash memory 102, buffer memory 103, or network IF 106.

<<Functional Configuration of Display Apparatus>>

Display apparatus 200 includes, in terms of its functional configuration, communicator 211, decoder 212, display 213, determiner 214, receiver 215, and controller 300.

Communicator 211 transmits and receives data to and from transmission apparatus 100 via wireless communication. Specifically, communicator 211 receives a plurality of packets including a plurality of transmission packets. Communicator 211 is one example of a receiver of display apparatus 200.

Furthermore, communicator 211 may transmit a control instruction to transmission apparatus 100 in accordance with an input received by receiver 215. An input received by receiver 215 is, for example, an input indicating that the channel of the airwaves received by tuner 104 is to be switched to a specified channel. A control instruction in this case is an instruction for switching the channel of the airwaves received by tuner 104 to a specified channel. Communicator 21 may transmit a control instruction output from controller 300 to transmission apparatus 100. A control instruction in this case will be described later in the description of controller 300.

Communicator 211 is implemented by, for example but not limited to, controller 201, flash memory 202, buffer memory 203, or network IF 206.

Decoder 212 generates a second video stream from a plurality of transmission packets included in a plurality of packets received by communicator 211. Decoder 212 then decodes a video for display from the generated second video stream. Decoder 212 outputs the obtained video for display to display 213. Decoder 212 is implemented by, for example but not limited to, controller 201, flash memory 202, or buffer memory 203.

Display 213 displays a video for display obtained by decoder 212. Display 213 is implemented, for example, by display device 204.

Determiner 214 determines whether packet loss has occurred, based on a plurality of packets received by communicator 211. Specifically, determiner 214 checks the information added to each of a plurality of packets to indicate its place in the sequence of transmission and determines whether there is any missing packet. If there is a missing packet, determiner 214 determines that packet loss has occurred. Meanwhile, if there is no missing packet, that is, if the items of information in the plurality of packets indicating their places in the sequence of transmission are consecutive, determiner 214 determines that no packet loss has occurred. For example, each time determiner 214 receives a packet among a plurality of packets, determiner 214 may determine whether the information added to that received packet indicating its place in the sequence of transmission is consecutive to the information added to the one received before indicating its place in the sequence of transmission. Then, if the two items of information are not consecutive, determiner 214 may determine that packet loss has occurred. Alternatively, for example, determiner 214 may check each of a plurality of packets received within a predetermined period for its place in the sequence of transmission, and if the checked order indicating their places in the sequence of transmission are not consecutive and there is a missing packet, determiner 214 may determine that packet loss has occurred. In this case, determiner 214 makes the determination of whether packet loss has occurred, at each of a plurality of predetermined periods. It suffices that a plurality of predetermined periods have no period in which the determination is not made, and the plurality of predetermined periods may include periods that overlap each other or may be continuous with no overlapping periods. In this manner, determiner 214 periodically determines whether packet loss has occurred.

Receiver 215 receives an input from a user. Receiver 215 transmits a control instruction corresponding to a received input to transmission apparatus 100 via communicator 211. As described above, an input received by receiver 215 is, for example, an input indicating that the channel of the airwaves received by tuner 104 is to be switched to a specified channel. A control instruction in this case is an instruction for switching the channel of the airwaves received by tuner 104 to a specified channel.

<<Controller>>

Figure 4:
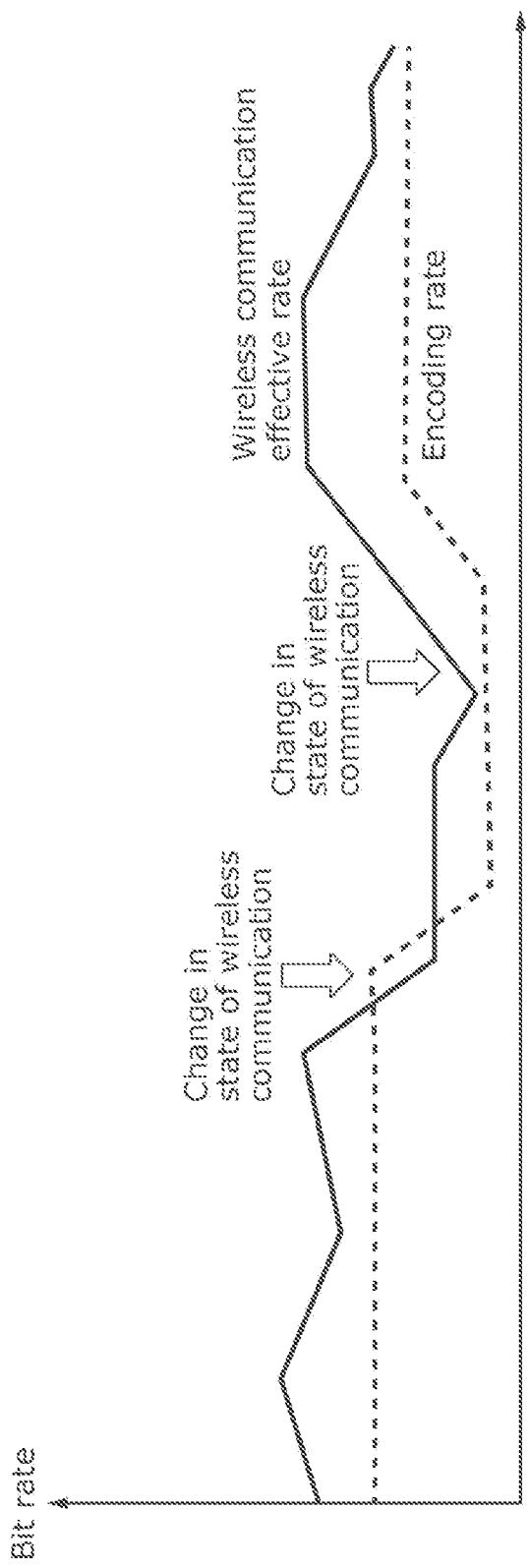
FIG. 4 is a diagram showing a relationship between the communication state of wireless communication and the control of the encoding rate.
Figure 5:
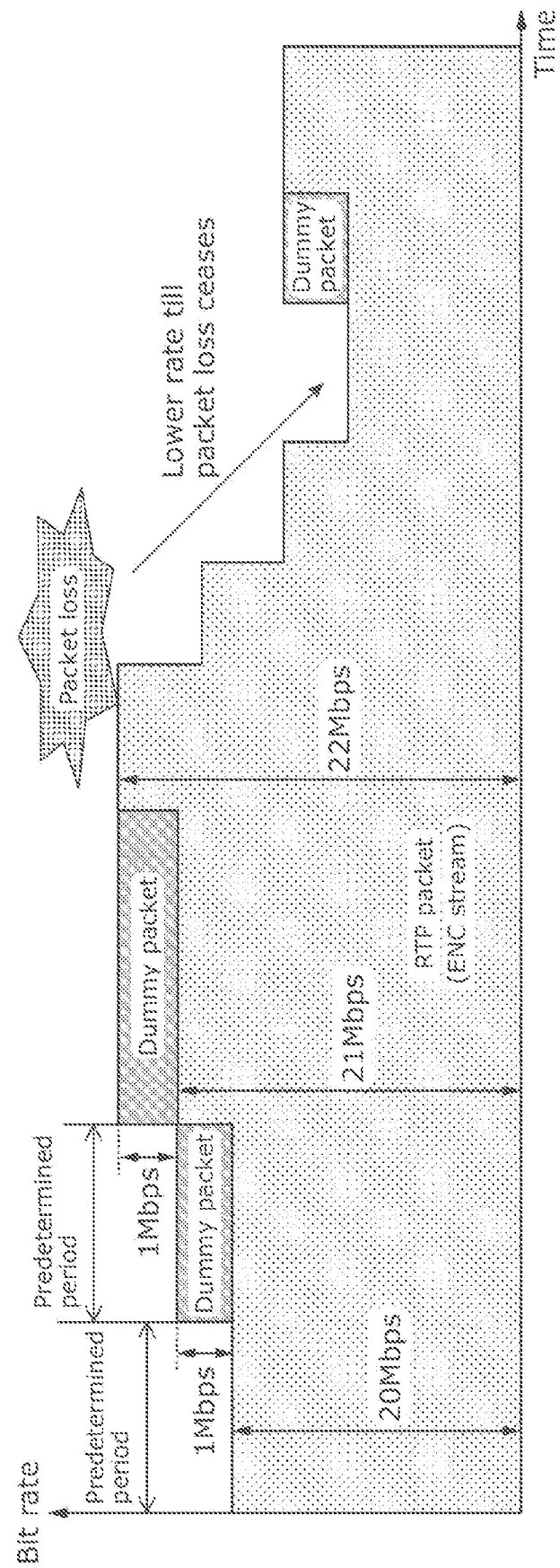
FIG. 5 is a diagram for describing how a controller controls the encoding rate.

FIG. 4 is a diagram showing a relationship between the communication state of wireless communication and the control of the encoding rate. FIG. 5 is a diagram for describing how a controller controls the encoding rate.

As shown in FIG. 4, controller 300 is a device for keeping a video stream transmitted to display apparatus 200 from being disrupted, by controlling the encoding rate (i.e., a second bit rate of a second video stream) in accordance with a change in the communication state of the wireless communication between transmission apparatus 100 and display apparatus 200. Controller 300 controls the encoding performed by transmission apparatus 100 in real time in accordance with a result of determination made by determiner 214. For example, as shown in FIG. 5, if a result of determination made by determiner 214 indicates that packet loss has occurred, controller 300 determines that the state of the wireless communication has changed and the effective rate of the wireless communication has dropped. If controller 300 determines that the effective rate of the wireless communication has dropped, controller 300 lowers the encoding rate by lowering a second bit rate to be targeted in the encoding performed by controller 112 of transmission apparatus 100. Controller 300 lowers the second bit rate by a predefined amount. Thus, controller 300 repeats the process of lowering the second bit rate by a predefined amount until no packet loss can be detected. Herein, instead of being lowered by a predefined amount, the second bit rate may be lowered at a transmission rate of a certain proportion relative to the transmission rate of a video stream to prevent congestion in the network.

Meanwhile, as shown in FIG. 5, if a result of determination made by determiner 214 indicates that packet loss has not occurred for a predetermined time, controller 300 determines that the wireless communication is stable. If controller 300 determines that the wireless communication is stable, controller 300 causes transmission apparatus 100 to transmit dummy packets, in addition to the second video stream being transmitted at the current second bit rate, and controller 300 then determines whether packet loss occurs. With this configuration, controller 300 determines whether transmission apparatus 100 can stably transmit, to display apparatus 200, data of a bit rate cumulative of the bit rate of the dummy packets and the bit rate of the second video stream. If controller 300 determines that transmission apparatus 100 can stably transmit, to display apparatus 200, data of a bit rate cumulative of the bit rate of the dummy packets and the bit rate of the second video stream, controller 300 raises the encoding rate by raising the second bit rate to be targeted in the encoding performed by controller 112 of transmission apparatus 100.

In this manner, by determining whether packet loss has occurred, controller 300 detects a change in the state of the wireless communication and, in accordance with any change detected, controls the encoding rate of transmission apparatus 100 in real time. With this configuration, transmission apparatus 100 can transmit a second video stream such that the video stream displayed in display apparatus 200 is not disrupted, and as high-quality a video for display as possible can be displayed in display apparatus 200 in accordance with the state of the wireless communication.

Herein, controller 300 generates a control instruction for controlling the encoding performed by controller 112 of transmission apparatus 100 and transmits the generated control instruction to transmission apparatus 100 via communicator 211. With this configuration, controller 300 controls the encoding performed in transmission apparatus 100 in accordance with a result of determination made by determiner 214. In the following description, a result of determination made by determiner 214 may also be referred to as "determination result".

An RTP packet indicated in FIG. 5 is one example of a transmission packet.

A specific process performed by controller 300 will now be described.

If a determination result indicates that packet loss has occurred, controller 300 generates a control instruction for lowering the second bit rate to be targeted in the encoding performed by controller 112 of transmission apparatus 100, and transmits the generated control instruction to transmission apparatus 100. In other words, if a determination result indicates that packet loss has occurred, controller 300 generates a control instruction for setting a bit rate lower than the current second bit rate as a target value in the encoding and transmits the generated control instruction to transmission apparatus 100. In response to receiving this control instruction, transmission apparatus 100 converts (encodes) a first video stream into a second video stream in accordance with the received control instruction such that the second video stream has a bit rate lower than the current second bit rate. In this manner, if a result of determination made by determiner 214 indicates that packet loss has occurred, controller 300 controls the encoding performed by controller 112 so as to lower the second bit rate.

Meanwhile, if a determination result indicates that packet loss has not occurred for a predetermined time (e.g., for ten seconds), controller 300 generates a control instruction for causing communicator 113 of transmission apparatus 100 to transmit a plurality of dummy packets, along with a plurality of transmission packets, to display apparatus 200 via wireless communication, and transmits the generated control instruction to transmission apparatus 100. In response to receiving this control instruction, transmission apparatus 100, in accordance with the received control instruction, causes communicator 113 of transmission apparatus 100 to transmit a plurality of dummy packets, along with a plurality of transmission packets, to display apparatus 200 via wireless communication. In this manner, if a determination result indicates that packet loss has not occurred for a predetermined time, controller 300 causes communicator 113 of transmission apparatus 100 to transmit a plurality of dummy packets, along with a plurality of transmission packets, to display apparatus 200 via wireless communication.

Furthermore, if a determination result indicates that packet loss has not occurred for a predetermined time, controller 300 may control the encoding performed by controller 112 so as not to change the second bit rate. Specifically, controller 300 may refrain from generating a control instruction for changing the second bit rate, or may generate a control instruction for setting the same bit rate as the current second bit rate as a target value in the encoding and transmit the generated control instruction to transmission apparatus 100.

Figure 6:
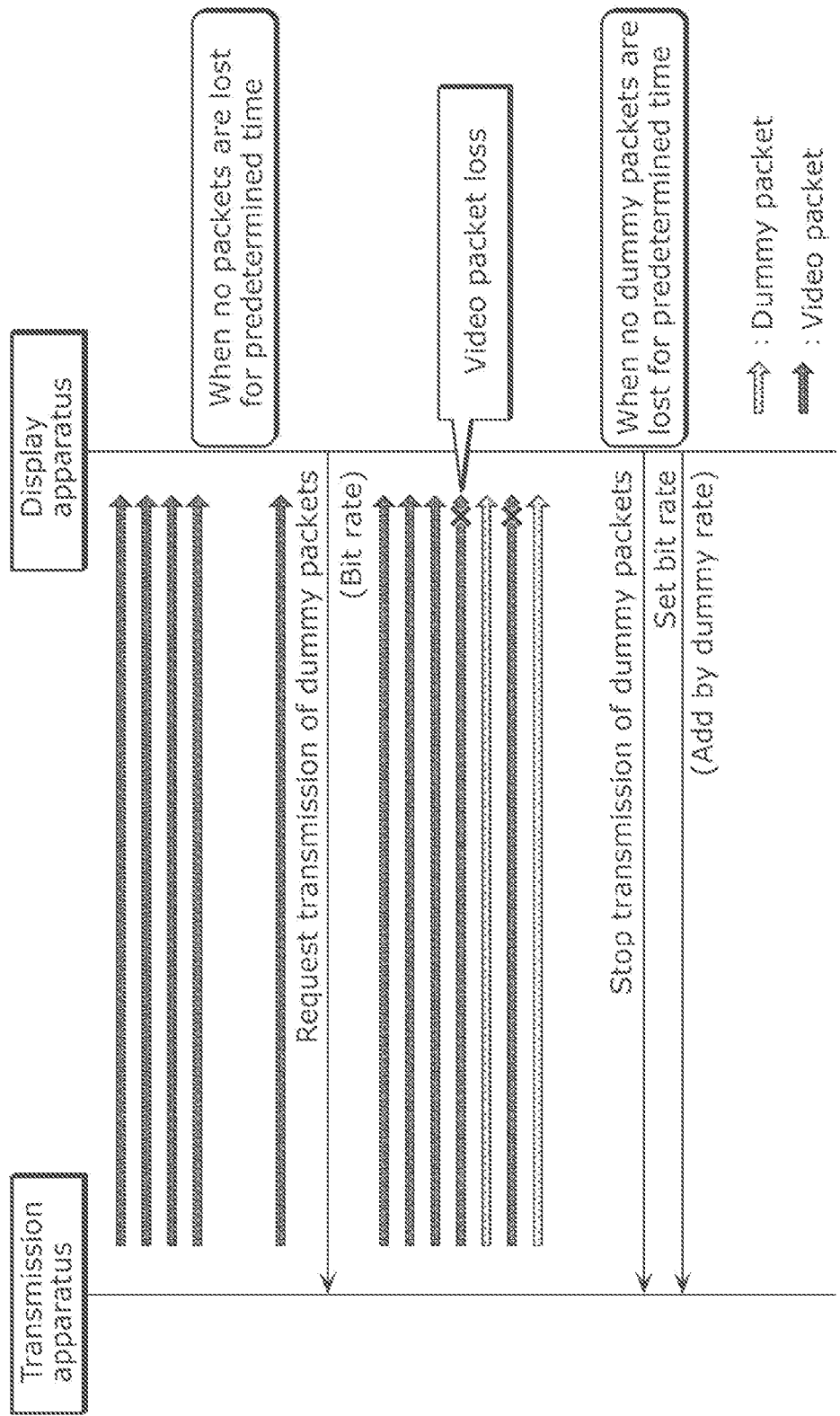
FIG. 6 is a diagram for describing a case in which packet loss occurs in packets of a video stream.

Incidentally, if packet loss occurs when controller 300 determines whether, with communicator 113 of transmission apparatus 100 transmitting a plurality of dummy packets, transmission apparatus 100 can stably transmit to display apparatus 200 data of a bit rate cumulative of the bit rate of the plurality of dummy packets and the bit rate of the second video stream, loss of a packet (a transmission packet) of the video stream may occur, as shown in FIG. 6. FIG. 6 is a diagram for describing a case in which packet loss occurs in packets of a video stream.

Figure 7:
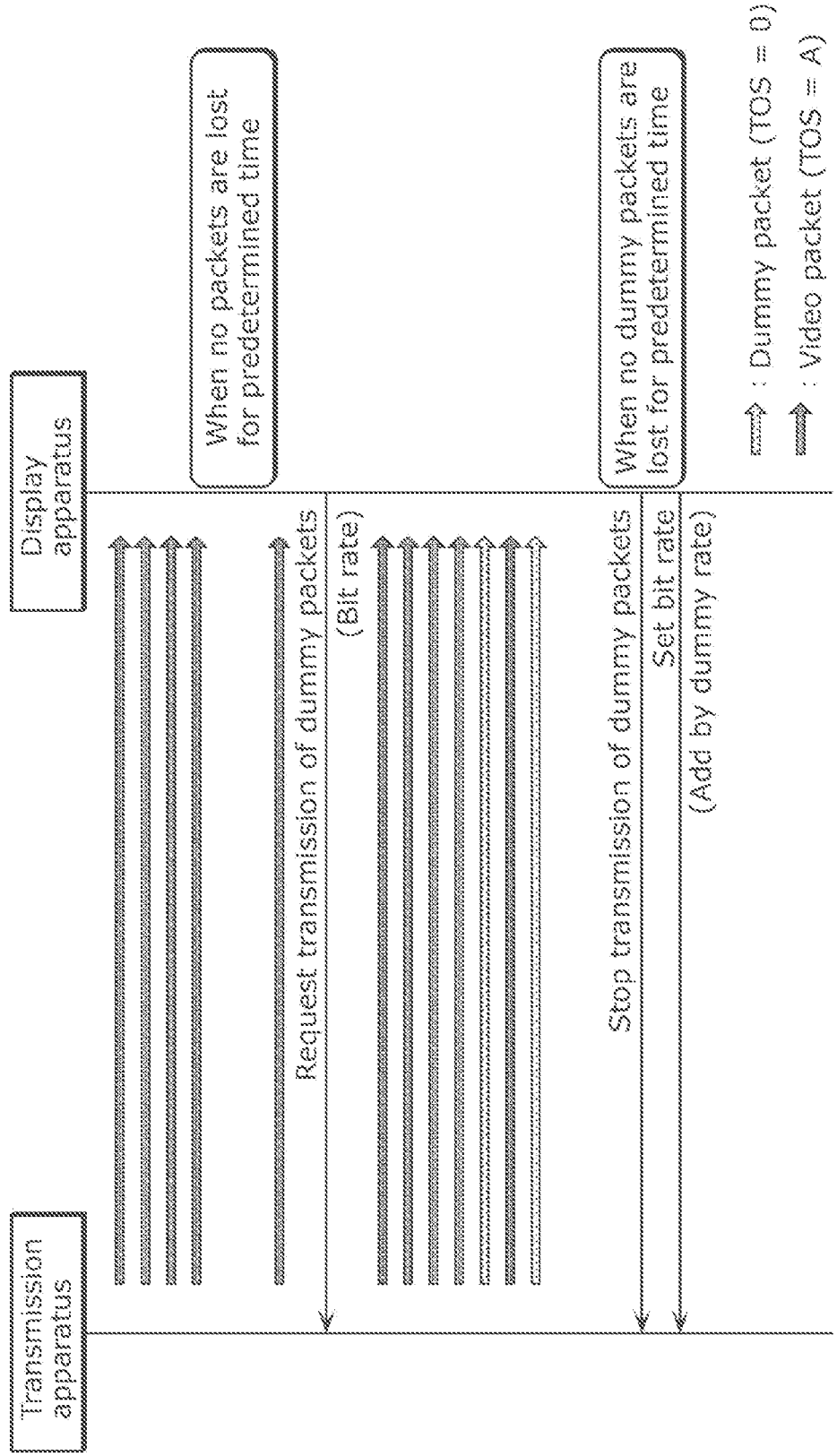
FIG. 7 is a diagram for describing the control for transmitting video stream packets with priority over dummy packets.

When transmitting a plurality of dummy packets along with a plurality of transmission packets, communicator 113 of transmission apparatus 100 may transmit the plurality of transmission packets with priority over the dummy packets. This configuration can keep packet loss of video packets from occurring even if the transmission of dummy packets has led to an increase in the total amount of data transmitted. FIG. 7 is a diagram for describing the control for transmitting video stream packets with priority over dummy packets.

Figure 8:
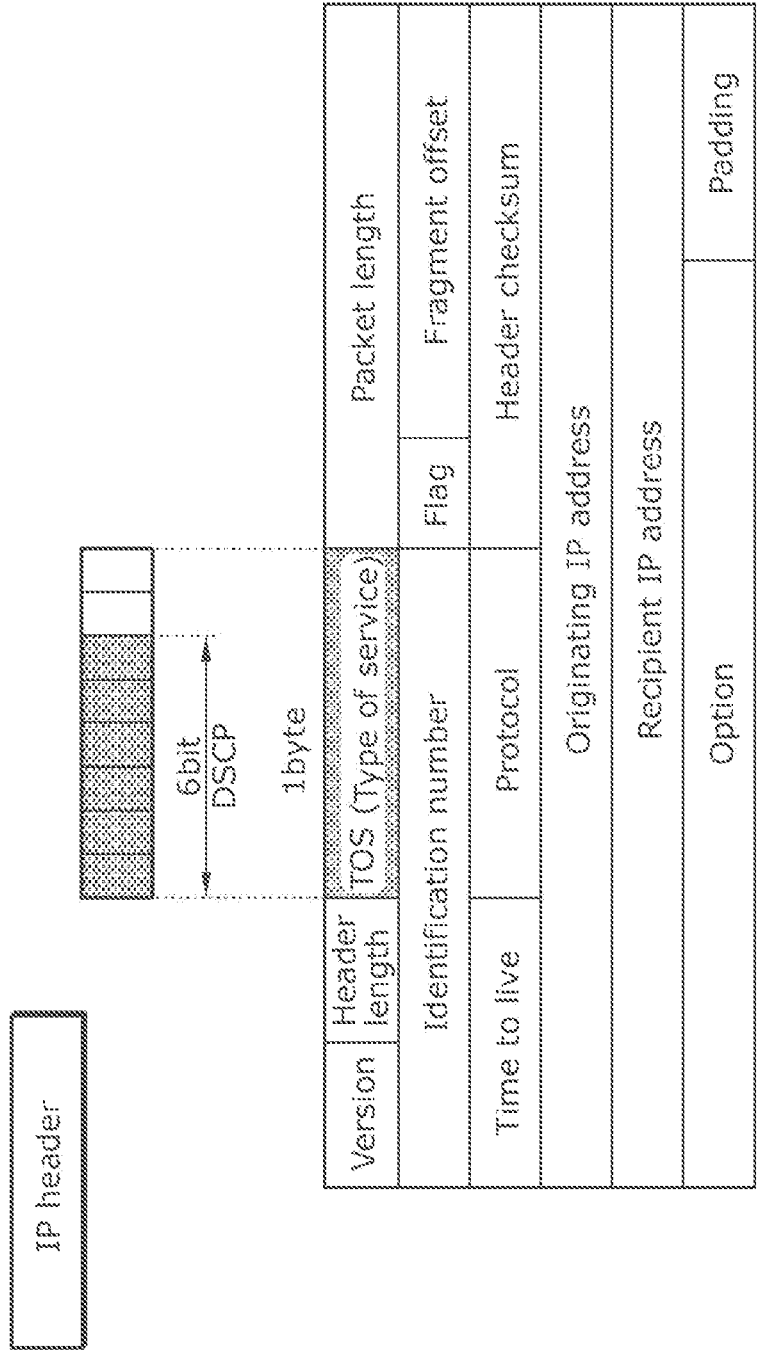
FIG. 8 is a diagram showing one example of an IP header structure.

Communicator 113 of transmission apparatus 100 transmits a plurality of transmission packets with priority over dummy packets, for example, with the use of a Quality of Service (QOS) mechanism. Specifically, as shown in FIG. 8, transmission apparatus 100 may set the value of the differentiated services code point (DSCP) in the packet header (the IP header) of a plurality of packets including video packets and dummy packets such that the plurality of transmission packets are transmitted with priority over the dummy packets, by setting the value of the DSCP of the video packets greater than the value of the DSCP of the dummy packets. For example, transmission apparatus 100 may set the value of the DSCP of the video packets to 40 and the value of the DSCP of the dummy packets to 0. FIG. 8 is a diagram showing one example of an IP header structure.

Figure 9:
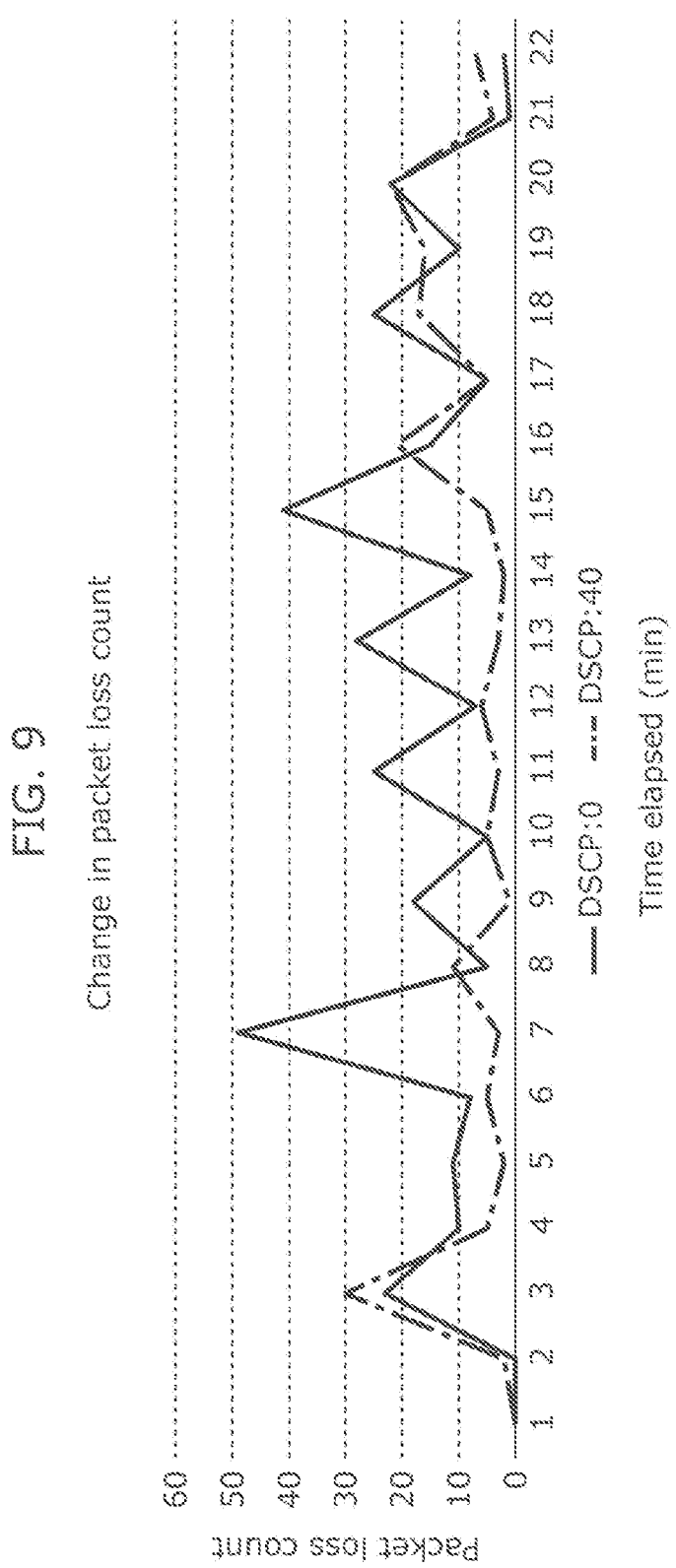
FIG. 9 is a diagram showing a change in the packet loss count observed when a plurality of transmission packets are transmitted with priority over dummy packets.

FIG. 9 is a diagram showing a change in the packet loss count observed when a plurality of transmission packets are transmitted with priority over dummy packets.

As shown in FIG. 9, as transmission apparatus 100 transmits a plurality of transmission packets with priority over dummy packets, the number of packets lost of the dummy packets can be let higher than the number of packets lost of the transmission packets.

If a determination result indicates that packet loss has not occurred for a predetermined time while communicator 113 of transmission apparatus 100 is transmitting a plurality of dummy packets, controller 300 generates a control instruction for raising the second bit rate to be targeted in the encoding and transmits the generated control instruction to transmission apparatus 100. In other words, if a determination result indicates that packet loss has not occurred for a predetermined time while communicator 113 of transmission apparatus 100 is transmitting a plurality of dummy packets, controller 300 generates a control instruction for setting a bit rate higher than the current second bit rate as a target value of the encoding and transmits the generated control instruction to transmission apparatus 100. In response to receiving this control instruction, transmission apparatus 100 converts (encodes) a first video stream into a second video stream in accordance with the received control instruction such that the second video stream has a bit rate higher than the current second bit rate. In this manner, if a determination result indicates that packet loss has not occurred for a predetermined time while communicator 113 is transmitting a plurality of dummy packets, controller 300 controls the encoding performed by controller 112 so as to raise the second bit rate. When controller 300 controls the encoding performed by controller 112 so as to raise the second bit rate, controller 300 raises the second bit rate by a bit rate corresponding to the transmission rate of the plurality of dummy packets.

If a determination result indicates that packet loss has occurred while communicator 113 of transmission apparatus 100 is transmitting a plurality of dummy packets, controller 300 controls the encoding performed by controller 112 so as not to change the second bit rate. The control for not changing the second bit rate is as described above.

In this case, controller 300 further generates a control instruction for causing communicator 113 to transmit a plurality of packets without dummy packets to display apparatus 200 via wireless communication, and transmits the generated control instruction to transmission apparatus 100. In response to receiving this control instruction, transmission apparatus 100, in accordance with the received control instruction, causes communicator 113 to transmit a plurality of packets without dummy packets to display apparatus 200. In this manner, if a determination result indicates that packet loss has occurred while communicator 113 of transmission apparatus 100 is transmitting a plurality of dummy packets, controller 300 causes communicator 113 to transmit a plurality of packets without dummy packets to display apparatus 200 via wireless communication. Furthermore, if a determination result indicates that packet loss has occurred while communicator 113 of transmission apparatus 100 is transmitting a plurality of dummy packets, controller 300 controls the encoding performed by controller 112 so as not to change the second bit rate.

When transmitting a plurality of dummy packets, communicator 113 of transmission apparatus 100 may transmit the plurality of dummy packets at a fixed transmission rate (e.g., 1 Mbps).

1-2. Operation

An operation of video transmission system 1 configured as described above will be described below.

Figure 10:
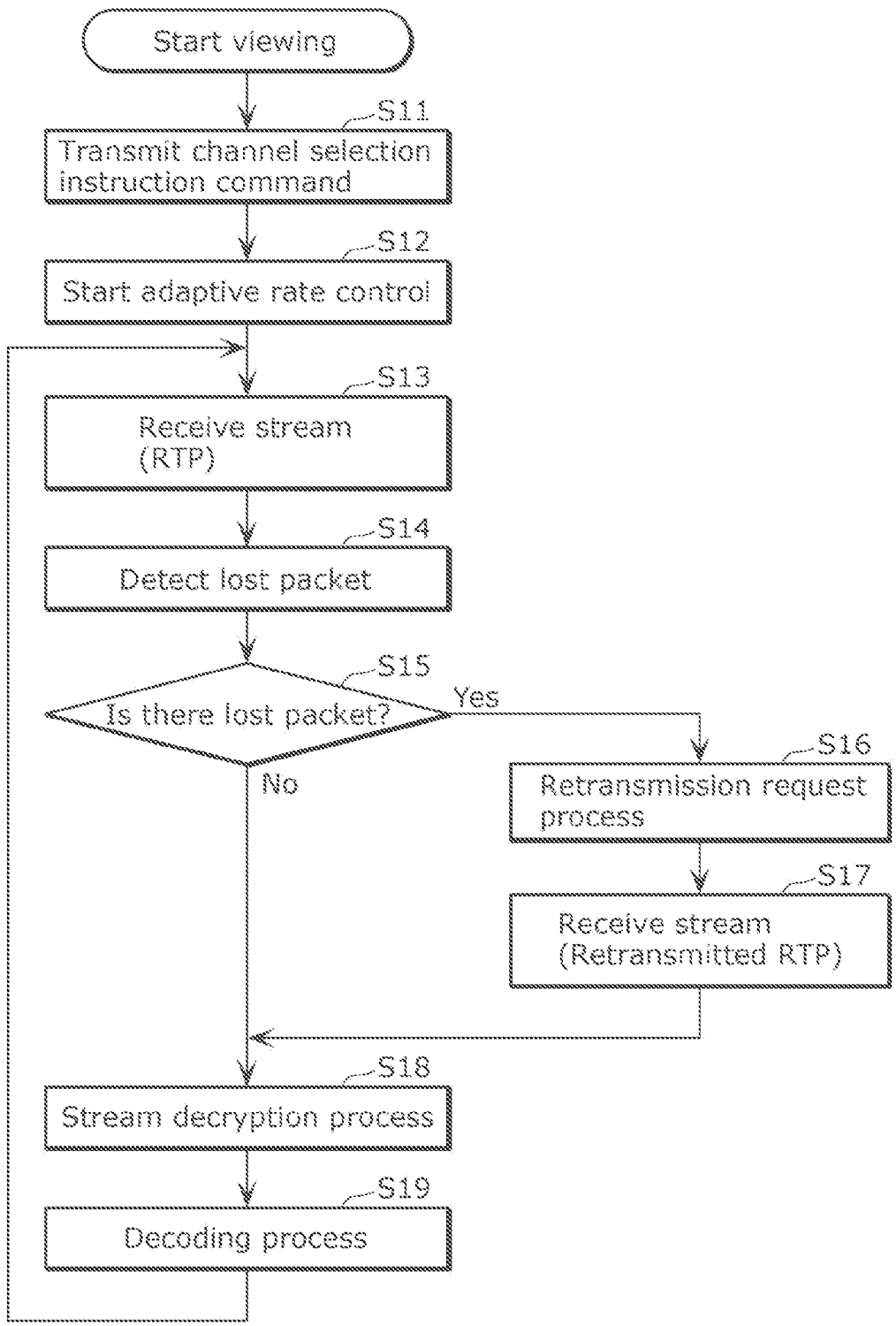
FIG. 10 is a flowchart showing one example of viewing control performed in a display apparatus.

FIG. 10 is a flowchart showing one example of viewing control performed in a display apparatus.

In response to receiving a channel selection instruction from a user, display apparatus 200 transmits a channel selection instruction command indicating the channel selection instruction to transmission apparatus 100 (S11). The process at step S11 is performed by receiver 215 of display apparatus 200.

Next, display apparatus 200 starts adaptive rate control of display apparatus 200 (S12). Details of the adaptive rate control of display apparatus 200 will be given later with reference to FIG. 11.

Next, display apparatus 200 receives a video stream by receiving a plurality of packets transmitted from transmission apparatus 100 (S13). The process at step S13 is performed by communicator 211 of display apparatus 200.

Next, display apparatus 200 performs a process of detecting a lost packet (S14). The detection result from this process is stored into flash memory 202.

Next, display apparatus 200 determines whether there is a lost packet, that is, whether packet loss has occurred (S15). The processes at steps S14 and S15 are performed by determiner 214 of display apparatus 200.

If display apparatus 200 determines that packet loss has occurred (Yes at S15), display apparatus 200 requests transmission apparatus 100 to retransmit the packet that has been lost (S16) and receives the retransmitted packet (S17). The process at step S17 is performed by communicator 211 of display apparatus 200.

If display apparatus 200 determines that no packet loss has occurred (No at S15), or after step S17, display apparatus 200 generates a video stream from the received plurality of packets by decrypting (turning into plaintext) the video stream (the encoded stream) encrypted by digital transmission content protection (DTCP) (S18), and further decodes a video for display from the decrypted video stream (S19).

The processes at steps S18 and S19 are performed by decoder 212 of display apparatus 200.

After step S19, the process returns to step S13.

Figure 11:
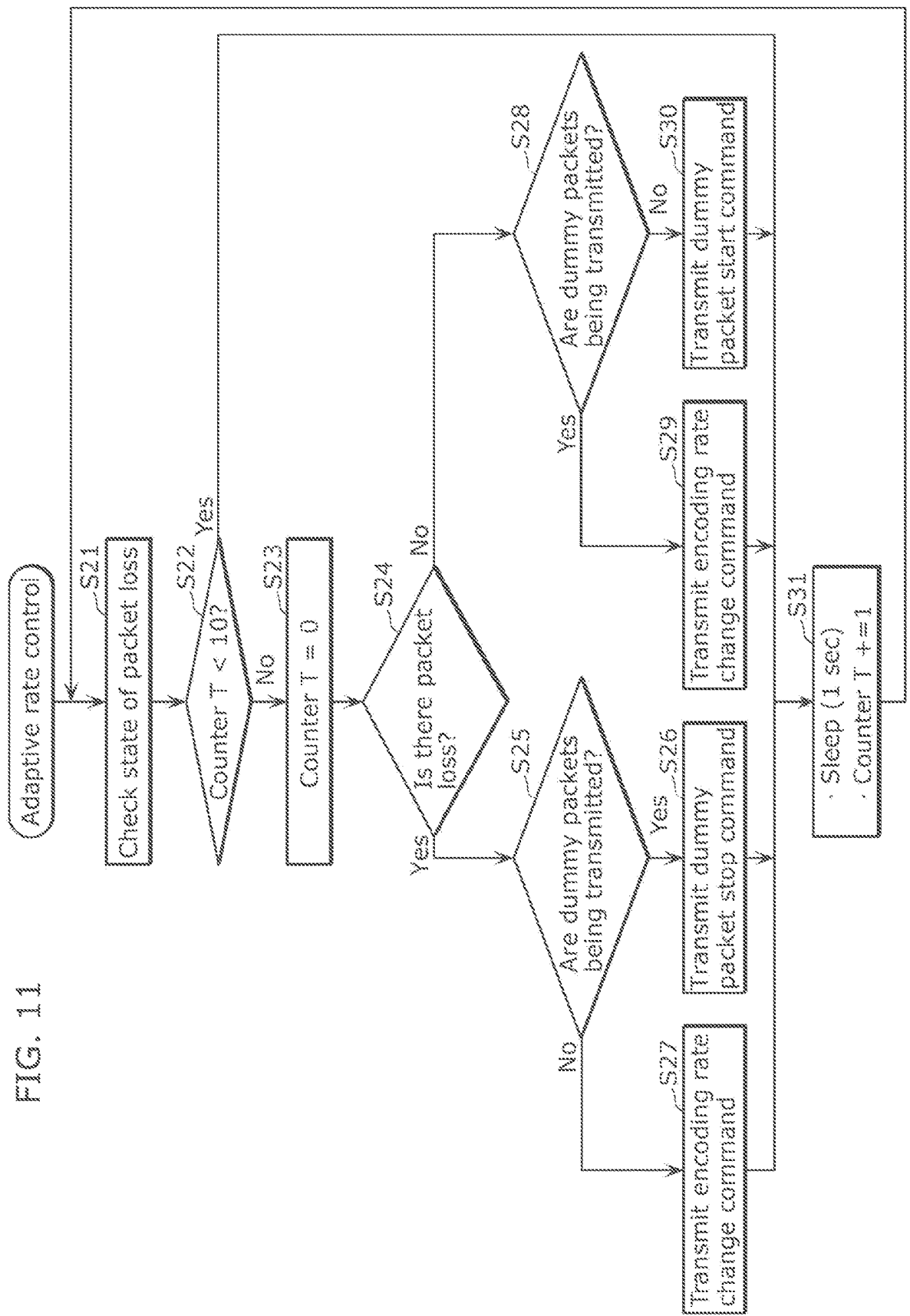
FIG. 11 is a flowchart showing one example of adaptive rate control performed in a display apparatus.

FIG. 11 is a flowchart showing one example of adaptive rate control performed in a display apparatus.

Display apparatus 200 checks the state of packet loss by referring to the result of detecting packet loss stored in flash memory 202 (S21). The process at step S21 is performed by determiner 214.

Next, display apparatus 200 determines whether counter T recorded in flash memory 202 is lower than 10 (S22).

If display apparatus 200 determines that counter T is not lower than 10 (No at S22), display apparatus 200 resets counter T to 0 (S23). The processes at steps S22 and S23 are performed by controller 300.

Next, display apparatus 200 determines whether packet loss has occurred (S24). The process at step S24 is performed by determiner 214.

If display apparatus 200 determines that packet loss has occurred (Yes at S24), display apparatus 200 determines whether transmission apparatus 100 is transmitting dummy packets (S25). Specifically, if display apparatus 200 is receiving dummy packets, display apparatus 200 may determine that transmission apparatus 100 is transmitting dummy packets. Meanwhile, if display apparatus 200 is receiving no dummy packets, display apparatus 200 may determine that transmission apparatus 100 is not transmitting any dummy packets. The process at step S25 is performed by communicator 211 of display apparatus 200.

If display apparatus 200 determines that transmission apparatus 100 is transmitting dummy packets (Yes at S25), display apparatus 200 transmits, to transmission apparatus 100, a dummy packet stop command (a control instruction) for causing transmission apparatus 100 to stop transmitting dummy packets (S26).

If display apparatus 200 determines that transmission apparatus 100 is not transmitting any dummy packets (No at S25), display apparatus 200 transmits a command (a control instruction) for lowering the encoding rate to transmission apparatus 100 (S27).

If display apparatus 200 determines that no packet loss has occurred (No at S24), display apparatus 200 determines whether transmission apparatus 100 is transmitting dummy packets (S28). The process at S28 is the same as the process at step S25.

If display apparatus 200 determines that transmission apparatus 100 is transmitting dummy packets (Yes at S28), display apparatus 200 transmits a command (a control instruction) for raising the encoding rate to transmission apparatus 100 (S29).

If display apparatus 200 determines that transmission apparatus 100 is not transmitting any dummy packets (No at S28), display apparatus 200 transmits, to transmission apparatus 100, a dummy packet start command (a control instruction) for causing transmission apparatus 100 to start transmitting dummy packets (S30).

After steps S26, S27, S29, and S30, display apparatus 200 enters sleep (stands by) for one second, increments the value of counter T by one, and stores incremented counter T into flash memory 202 (S31).

The processes at steps S25 to S31 are performed by controller 300.

After step S31, the process returns to step S21.

Figure 12:
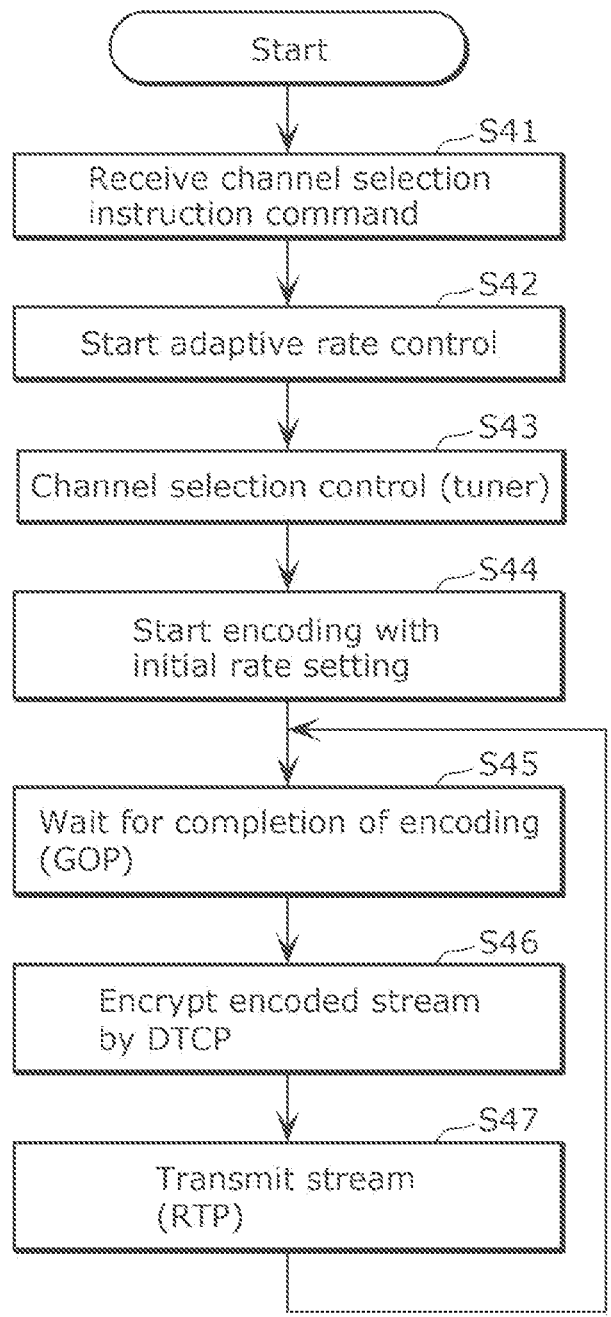
FIG. 12 is a flowchart showing one example of transmission control performed in a transmission apparatus.

FIG. 12 is a flowchart showing one example of transmission control performed in a transmission apparatus.

Transmission apparatus 100 receives a channel selection instruction command from display apparatus 200 (S41). The process at step S41 is performed by communicator 113 of transmission apparatus 100.

Next, transmission apparatus 100 starts adaptive rate control of transmission apparatus 100 (S42). Details of the adaptive rate control of transmission apparatus 100 will be given later with reference to FIG. 13.

Next, transmission apparatus 100 performs channel selection control of switching the channel to a channel specified by the received channel selection instruction command (S43). The process at step S43 is performed by controller 112.

Next, transmission apparatus 100 encodes a first video stream to have an initial rate and generates a second video stream (S44).

Next, transmission apparatus 100 stands by to see whether the encoding of the video stream of a predetermined segment has been completed (S45). A predetermined segment is, for example, a segment of a random access unit and is a segment of a Group of Picture (GOP) unit.

Next, transmission apparatus 100 generates a video stream (an encoded stream) encrypted by digital transmission content protection (DTCP) (S46). The processes at steps S44 to S46 are performed by controller 112.

Next, transmission apparatus 100 transmits the generated encoded stream to display apparatus 200 in the form of packets (S47). The process at step S47 is performed by communicator 113.

After step S47, the process returns to step S45.

Figure 13:
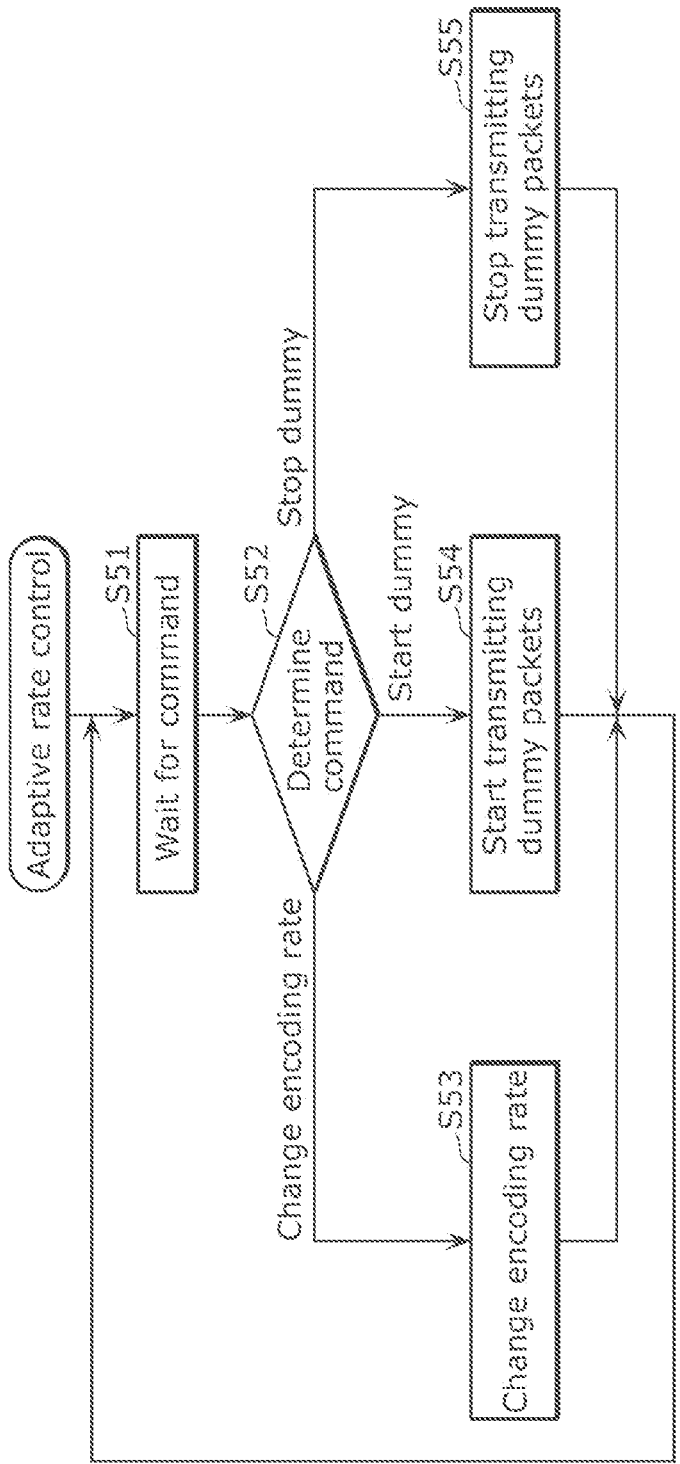
FIG. 13 is a flowchart showing one example of adaptive rate control performed in a transmission apparatus.

FIG. 13 is a flowchart showing one example of adaptive rate control performed in a transmission apparatus.

Transmission apparatus 100 stands by till it receives a command (a control instruction) (S51). The process at step S51 is performed by communicator 113.

Transmission apparatus 100 determines whether a received command is a command for changing the encoding rate, a command for starting the transmission of dummy packets, or a command for stopping the transmission of dummy packets (S52).

If the received command is a command for changing the encoding rate ("Change encoding rate" at S52), transmission apparatus 100 changes the encoding rate to the encoding rate indicated by the received command (S53).

If the received command is a command for starting the transmission of dummy packets ("Start dummy" at S52), transmission apparatus 100 starts transmitting dummy packets (S54).

If the received command is a command for stopping the transmission of dummy packets ("Stop dummy" at S52), transmission apparatus 100 stops transmitting dummy packets (S55). The processes at steps S53 to S55 are performed by controller 112.

After steps S53 to S55, the process returns to step S51.

1-3. Advantageous Effects and Others

As described above, video transmission system 1 according to the present embodiment includes transmission apparatus 100 that transmits a video stream, display apparatus 200 that is separate from transmission apparatus 100 and that receives the video stream and displays a video represented by the video stream, and controller 300. Transmission apparatus 100 includes controller 112 and communicator 113. Controller 112 generates a second video stream by encoding a first video stream to turn the first video stream of a first bit rate to a video stream of a second bit rate that is lower than or equal to the first bit rate. Communicator 113 divides a second video stream into a plurality of transmission packets and transmits a plurality of packets including the plurality of transmission packets to display apparatus 200 via wireless communication. Display apparatus 200 includes communicator 211, decoder 212, display 213, and determiner 214. Communicator 211 receives a plurality of packets. Decoder 212 generates a second video stream from a plurality of transmission packets and decodes a video for display from the second video stream. Display 213 displays a video for display. Determiner 214 determines whether packet loss has occurred, based on a plurality of packets received by communicator 211. If a result of determination made by determiner 214 indicates that packet loss has occurred, controller 300 controls the encoding performed by controller 112 so as to lower the second bit rate. If a determination result indicates that packet loss has not occurred for a predetermined time, controller 300 causes communicator 113 to transmit a plurality of dummy packets, along with a plurality of transmission packets, to display apparatus 200 via wireless communication.

According to this configuration, controller 300 determines that the communication bandwidth between transmission apparatus 100 and display apparatus 200 is not sufficient for the transmission of a video stream if packet loss occurs in display apparatus 200, and controls the encoding performed by controller 112 of transmission apparatus 100 so as to lower the second bit rate. Therefore, transmission apparatus 100 can lower the bit rate of a video stream in accordance with the communication bandwidth and transmit the video stream without any loss from transmission apparatus 100 to display apparatus 200.

Meanwhile, controller 300 determines that the communication bandwidth is sufficient for the transmission of a video stream if a determination result indicates that packet loss has not occurred for a predetermined time, and causes transmission apparatus 100 to transmit a plurality of dummy packets, along with a plurality of transmission packets, to display apparatus 200. With this configuration, transmission apparatus 100 transmits, to display apparatus 200, data of a bit rate that is greater by the bit rate of the dummy packets. Accordingly, the communication bandwidth can be determined to be less congested than before the dummy packets are transmitted.

Therefore, the bitstream of a video stream being transmitted can be adjusted appropriately in accordance with the communication bandwidth of the wireless communication.

In video transmission system 1 according to the present embodiment, controller 300 controls the encoding performed by controller 112 so as not to change the second bit rate if a determination result indicates that packet loss has not occurred for a predetermined time.

With this configuration, transmission apparatus 100 transmits, to display apparatus 200, data of a bit rate that is greater by the bit rate of the dummy packets. Accordingly, the communication bandwidth can be measured to be less congested than before the dummy packets are transmitted. Since it is a dummy packet that may get lost when the communication bandwidth is narrowed and packet loss occurs as a result, the plurality of packets can be transmitted from transmission apparatus 100 to display apparatus 200 such that the video stream is not disrupted.

In video transmission system 1 according to the present embodiment, if a determination result indicates that packet loss has not occurred for a predetermined time while communicator 113 is transmitting a plurality of dummy packets, controller 300 controls the encoding performed by controller 112 so as to raise the second bit rate.

With this configuration, the second bit rate is raised if it is determined that the communication bandwidth is sufficient for the transmission of a video stream while dummy packets are being transmitted, the quality of the video can be improved when there is a sufficient communication bandwidth.

In video transmission system 1 according to the present embodiment, when controller 300 controls the encoding performed by controller 112 so as to raise the second bit rate, controller 300 raises the second bit rate by a bit rate corresponding to the transmission rate of the plurality of dummy packets.

With this configuration, the second bit rate is raised by a bit rate corresponding to the transmission rate of the plurality of dummy packets if it is determined that the communication bandwidth is sufficient for the transmission of a video stream while dummy packets are being transmitted, the quality of the video can be improved when there is a sufficient communication bandwidth.

In video transmission system 1 according to the present embodiment, if a determination result indicates that packet loss has occurred while communicator 113 is transmitting a plurality of dummy packets, controller 300 causes communicator 113 to transmit a plurality of packets without dummy packets to display apparatus 200 via wireless communication.

With this configuration, if it is determined that the communication bandwidth between transmission apparatus 100 and display apparatus 200 is not sufficient for the transmission of a video stream while dummy packets are being transmitted, no dummy packets are transmitted, and thus the bit rate of the transmission can be lowered without lowering the quality of the video.

In video transmission system 1 according to the present embodiment, if a determination result indicates that packet loss has occurred while communicator 113 is transmitting a plurality of dummy packets, controller 300 further controls the encoding performed by controller 112 so as not to change the second bit rate.

With this configuration, if it is determined that the communication bandwidth between transmission apparatus 100 and display apparatus 200 is not sufficient for the transmission of a video stream while dummy packets are being transmitted, no dummy packets are transmitted while refraining from changing the second bit rate, and thus the bit rate of the transmission can be lowered without lowering the quality of the video.

In video transmission system 1 according to the present embodiment, when transmitting a plurality of dummy packets along with a plurality of transmission packets, communicator 113 transmits the plurality of transmission packets with priority over the dummy packets.

Therefore, since it is a dummy packet that gets lost in priority over the transmission packets when the communication bandwidth is narrowed and packet loss occurs as a result, the video stream can be transmitted from transmission apparatus 100 to display apparatus 200 without any disruption.

In video transmission system 1 according to the present embodiment, when transmitting a plurality of dummy packets, communicator 113 transmits the plurality of dummy packets at a fixed transmission rate.

With this configuration, by transmitting dummy packets or stopping the transmission of dummy packets, the transmission rate of packets from transmission apparatus 100 can be adjusted.

1-4. Variations

In the examples described above according to the embodiment, controller 300 is included in display apparatus 200, but this is not a limiting example. Controller 300 may be included in transmission apparatus 100. In this case, transmission apparatus 100 periodically obtains a result of determination made by determiner 214 of display apparatus 200 from display apparatus 200. With this configuration, in accordance with a result of determination made by determiner 214, controller 300 can execute the adaptive rate control described with reference to FIG. 11 and output a command to controller 112, and thus controller 300 can control the encoding performed in transmission apparatus 100.

Controller 300 may be a component separate from transmission apparatus 100 and display apparatus 200. Controller 300 in this case can periodically obtain a result of determination made by determiner 214 of display apparatus 200 from display apparatus 200 and execute the adaptive rate control described with reference to FIG. 11, and thus controller 300 can control the encoding performed in transmission apparatus 100.

Thus far, the video transmission system and others according to the embodiment of the present disclosure have been described, but this embodiment does not limit the present disclosure.

Each of the processors included in the video transmission system, the transmission apparatus, the display apparatus, and so forth according to the foregoing embodiment is typically implemented in the form of an LSI circuit, which is an integrated circuit. Such processors may each be implemented by a single chip, or a part or the whole of such processors may be implemented by a single chip.

The circuit integration is not limited to LSI, and an integrated circuit may be implemented by a dedicated circuit or a general purpose processor. A field programmable gate array (FPGA) that can be programmed after an LSI circuit has been manufactured or a reconfigurable processor in which the connections or the settings of the circuit cells within an LSI circuit can be reconfigured may also be used.

In the foregoing embodiment, the constituent elements may each be implemented by a dedicated piece of hardware or may each be implemented through the execution of a software program suitable for a corresponding constituent element. The constituent elements may each be implemented as a program executing unit, such as a CPU or a processor, reads out a software program recorded on a recording medium, such as a hard disk or a semiconductor memory, and executes the software program.

The present disclosure may be implemented in the form of a video transmission method, a transmission method, a display method, and so forth to be executed by the video transmission system, the transmission apparatus, the display apparatus, and so forth.

The divisions of the functional blocks in the block diagrams are merely examples. A plurality of functional blocks may be implemented as a single functional block, a single functional block may be divided into a plurality of functional blocks, or one or more of the functions may be transferred to another functional block. The functions of a plurality of functional blocks having similar functions may be processed in parallel or through time sharing by a single piece of hardware or software.

The order of executing the steps in each flowchart is for illustrating an example for describing the present disclosure in concrete terms, and the order may differ from the ones described above. One or more of the steps may be executed simultaneously (in parallel) with another step.

Thus far, the video transmission system, the transmission apparatus, the display apparatus, and so forth according to one or more aspects have been described based on the embodiment, but this embodiment does not limit the present disclosure. Unless departing from the spirit of the present disclosure, an embodiment obtained by making various modifications that are conceivable by a person skilled in the art to the present embodiment or an embodiment obtained by combining the constituent elements in different embodiments may also be encompassed by the scope of the one or more aspects.

INDUSTRIAL APPLICABILITY

The present disclosure can be applied to, for example but not limited to, a video transmission system that can appropriately adjust the bitstream of a video stream being transmitted in accordance with the communication bandwidth of wireless communication.

The invention claimed is:

1. A video transmission system comprising:
a transmission apparatus that transmits a video stream;
a display apparatus that is separate from the transmission apparatus, receives the video stream, and displays a video represented by the video stream; and
a controller, wherein
the transmission apparatus includes:
an encoder that performs encoding of a first video stream to generate a second video stream, the encoding causing a first bit rate of the first video stream to be a second bit rate lower than or equal to the first bit rate; and
a transmitter that divides the second video stream into a plurality of transmission packets and transmits a plurality of packets including the plurality of transmission packets to the display apparatus via a network,
the display apparatus includes:
a receiver that receives the plurality of packets;
a decoder that generates the second video stream using the plurality of transmission packets and decodes a video for display from the second video stream;
a display that displays the video for display; and
a processor configured to determine whether packet loss has occurred, based on the plurality of packets received by the receiver,
the controller:
(i) controls the encoding performed by the encoder to reduce the second bit rate by a predefined amount or reduce the second bit rate at a transmission rate of a certain proportion, when a determination result of the processor indicates that packet loss has occurred; and
(ii) causes the transmitter to transmit a plurality of dummy packets, along with the plurality of transmission packets, to the display apparatus via the network, when the determination result indicates that packet loss has not occurred for a predetermined time, and,
when transmitting the plurality of dummy packets along with the plurality of transmission packets, the transmitter transmits the plurality of transmission packets with priority over the plurality of dummy packets.

2. The video transmission system according to claim 1, wherein
the controller controls the encoding performed by the encoder to avoid changing the second bit rate, when the determination result indicates that packet loss has not occurred for the predetermined time.

3. The video transmission system according to claim 1, wherein
the controller controls the encoding performed by the encoder to raise the second bit rate, when the determination result indicates that packet loss has not occurred for the predetermined time while the transmitter is transmitting the plurality of dummy packets.

4. The video transmission system according to claim 3, wherein
when controlling the encoding performed by the encoder to raise the second bit rate, the controller raises the second bit rate by a bit rate corresponding to a transmission rate of the plurality of dummy packets.

5. The video transmission system according to claim 1, wherein
the controller causes the transmitter to transmit the plurality of packets without the plurality of dummy packets to the display apparatus via the network, when the determination result indicates an occurrence of packet loss while the transmitter is transmitting the plurality of dummy packets.

6. The video transmission system according to claim 5, wherein
the controller further controls the encoding performed by the encoder so as not to change the second bit rate, when the determination result indicates an occurrence of packet loss while the transmitter is transmitting the plurality of dummy packets.

7. The video transmission system according to claim 1, wherein
when transmitting the plurality of dummy packets, the transmitter transmits the plurality of dummy packets at a fixed transmission rate.

8. A transmission apparatus that is included in a video transmission system and transmits a video stream, the video transmission system including a display apparatus that is separate from the transmission apparatus, receives the video stream, and displays a video represented by the video stream, and a controller, the transmission apparatus comprising:
an encoder that performs encoding of a first video stream to generate a second video stream, the encoding causing a first bit rate of the first video stream to be a second bit rate lower than or equal to the first bit rate; and
a transmitter that divides the second video stream into a plurality of transmission packets and transmits a plurality of packets including the plurality of transmission packets to the display apparatus via a network, wherein
the transmission apparatus receives, from the controller, an instruction, which instructs the transmission apparatus to:
(i) control the encoding performed by the encoder to reduce the second bit rate by a predefined amount or reduce the second bit rate at a transmission rate of a certain proportion; and
(ii) cause the transmitter to transmit a plurality of dummy packets, along with the plurality of transmission packets, to the display apparatus via the network, and
when transmitting the plurality of dummy packets along with the plurality of transmission packets, the transmitter transmits the plurality of transmission packets with priority over the plurality of dummy packets.

9. A display apparatus included in a video transmission system, the video transmission system including a transmission apparatus and a controller, the display apparatus being separate from a transmission apparatus, receiving a video stream, and displaying a video represented by the video stream, the display apparatus comprising:
a receiver that receives a plurality of packets including a plurality of transmission packets from the transmission apparatus via a network;
a decoder that generates a second video stream from the plurality of transmission packets and decodes a video for display from the second video stream;
a display that displays the video for display; and
a processor configured to determine whether packet loss has occurred, based on the plurality of packets received by the receiver, wherein
when a determination result of the processor indicates that packet loss has occurred, the display apparatus transmits, to the controller, a first instruction, which instructs the controller to control the encoding performed by the transmission apparatus to reduce a second bit rate, which is a bit rate at which the second video stream is divided into the plurality of transmission packets, by a predefined amount or reduce the second bit rate at a transmission rate of a certain proportion; and
when the determination result indicates that packet loss has not occurred for a predetermined time, the display apparatus:
transmits, to the controller, a second instruction, which instructs the controller to cause the transmission apparatus to transmit a plurality of dummy packets, along with the plurality of transmission packets, to display apparatus via the network, and
receives the plurality of transmission packets including (1) the plurality of dummy packets and (2) the plurality of transmission packets transmitted with priority over the plurality of dummy packets.

10. A video transmission method for a video transmission system, the video transmission system including a transmission apparatus that transmits a video stream, a display apparatus that is separate from the transmission apparatus and that receives the video stream and displays a video represented by the video stream, and a controller, the video transmission method comprising:

by the transmission apparatus:
performing encoding of a first video stream to generate a second video stream, the encoding causing a first bit rate of the first video stream to be a second bit rate lower than or equal to the first bit rate; and
dividing the second video stream into a plurality of transmission packets and transmitting a plurality of packets including the plurality of transmission packets to the display apparatus via a network,
by the display apparatus:
receiving the plurality of packets;
generating the second video stream from the plurality of transmission packets and decoding a video for display from the second video stream;
displaying the video for display; and
determining whether packet loss has occurred, based on the plurality of packets received, and
by the controller:
(i) controlling the encoding performed by the transmission apparatus to reduce the second bit rate by a predefined amount or reduce the second bit rate at a transmission rate of a certain proportion, when a determination result of the display apparatus indicates an occurrence of packet loss; and
(ii) causing the transmission apparatus to transmit a plurality of dummy packets, along with the plurality of transmission packets, to the display apparatus via the network, when the determination result indicates that packet loss has not occurred for a predetermined time, wherein
when transmitting the plurality of dummy packets along with the plurality of transmission packets, the transmission apparatus transmits the plurality of transmission packets with priority over the plurality of dummy packets.

11. A non-transitory computer-readable recording medium having recorded thereon a program for causing a computer to execute the video transmission method according to claim 10.

12. The video transmission system according to claim 1, wherein
the plurality of transmission packets and the plurality of dummy packed each include a priority level, and
the priority level included in the plurality of transmission packets is higher than the priority level included in the plurality of dummy packets.

13. The transmission apparatus according to claim 8, wherein
the plurality of transmission packets and the plurality of dummy packed each include a priority level, and
the priority level included in the plurality of transmission packets is higher than the priority level included in the plurality of dummy packets.

14. The display apparatus according to claim 9, wherein
the plurality of transmission packets and the plurality of dummy packed each include a priority level, and
the priority level included in the plurality of transmission packets is higher than the priority level included in the plurality of dummy packets.

15. The video transmission method according to claim 10, wherein the plurality of transmission packets and the plurality of
dummy packed each include a priority level, and
the priority level included in the plurality of transmission
packets is higher than the priority level included in the
plurality of dummy packets.

\* \* \* \* \*